(12) United States Patent
Takeuchi

(10) Patent No.: US 7,211,974 B2
(45) Date of Patent: May 1, 2007

(54) MOTOR AND DRIVE CONTROL SYSTEM THEREOF

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/445,396

(22) Filed: Jun. 1, 2006

(65) Prior Publication Data

US 2006/0220603 A1 Oct. 5, 2006

Related U.S. Application Data

(62) Division of application No. 11/078,960, filed on Mar. 11, 2005, now Pat. No. 7,095,155.

(30) Foreign Application Priority Data

Mar. 12, 2004 (JP) .............................. 2004-071417

(51) Int. Cl.
*H02P 3/20* (2006.01)
(52) U.S. Cl. ...................... 318/280; 318/282; 318/599; 318/286
(58) Field of Classification Search .................. None
See application file for complete search history.

(56) References Cited

U.S. PATENT DOCUMENTS

| | | | |
|---|---|---|---|
| 3,762,042 A | | 10/1973 | Abe et al. |
| 4,215,304 A | * | 7/1980 | D'Atre et al. ............... 318/758 |
| 5,041,769 A | | 8/1991 | Iwai |
| 5,124,625 A | * | 6/1992 | Wakabayashi .............. 318/603 |
| 5,250,765 A | * | 10/1993 | Mizuno et al. ............. 187/316 |
| 5,780,983 A | * | 7/1998 | Shinkawa et al. .......... 318/254 |
| 6,257,027 B1 | | 7/2001 | Imai |
| 6,346,785 B1 | | 2/2002 | Dainez et al. |
| 6,433,503 B1 | * | 8/2002 | Uematsu et al. ............ 318/700 |
| 6,455,969 B1 | | 9/2002 | Chen |
| 6,548,981 B1 | * | 4/2003 | Ishii et al. .................. 318/538 |
| 6,794,777 B1 | | 9/2004 | Fradella |

(Continued)

FOREIGN PATENT DOCUMENTS

JP 54-129417 10/1979

(Continued)

OTHER PUBLICATIONS

Communication from Japanese Patent Office regarding corresponding application.

(Continued)

*Primary Examiner*—Lincoln Donovan
*Assistant Examiner*—Renata McCloud
(74) *Attorney, Agent, or Firm*—Harness, Dickey & Pierce, P.L.C.

(57) ABSTRACT

Provided is a motor having a magnetic polar unit in which a permanent magnetic polar array having arranged therein alternately a plurality of permanent magnetic polar elements in alternate opposite poles is made to face a plurality of electromagnetic coil arrays alternately excited at opposite poles, and the permanent magnetic polar array is made to move thereby; wherein the motor further comprises a sensor for detecting the periodical magnetic change accompanying the movement of the permanent magnetic polar array, the output of the sensor is directly returned as a direct drive waveform to the electromagnetic coils, and this drive circuit forms the excitation signal based on the return signal.

9 Claims, 25 Drawing Sheets

U.S. PATENT DOCUMENTS

| | | |
|---|---|---|
| 6,930,433 B2 | 8/2005 | Bales et al. |
| 2003/0182975 A1 | 10/2003 | Tomigashi et al. |
| 2003/0227287 A1 | 12/2003 | Hori et al. |
| 2004/0145323 A1 | 7/2004 | Maslov et al. |

FOREIGN PATENT DOCUMENTS

| | | |
|---|---|---|
| JP | 56-120785 U | 9/1981 |
| JP | 62-016088 | 1/1987 |
| JP | 51-95212 A | 8/1993 |
| JP | 07-336967 A | 12/1995 |
| JP | 08-051745 | 2/1996 |
| JP | 10-290558 A | 10/1998 |
| JP | 2003-289690 A | 10/2003 |
| JP | 2004-64845 | 2/2004 |

OTHER PUBLICATIONS

Communication from Japanese Patent Office regarding counterpart application.

* cited by examiner

FIG.3
(1)
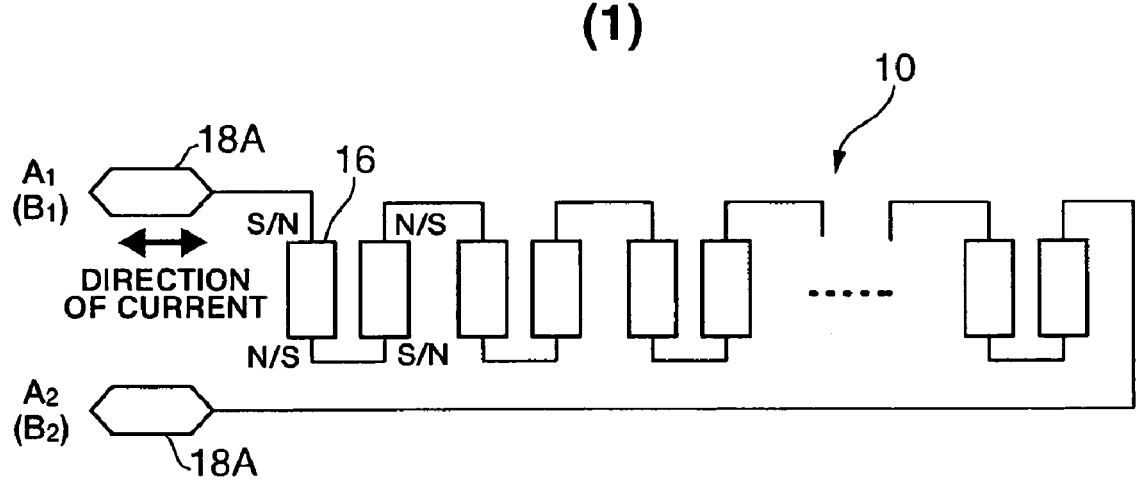
(2)
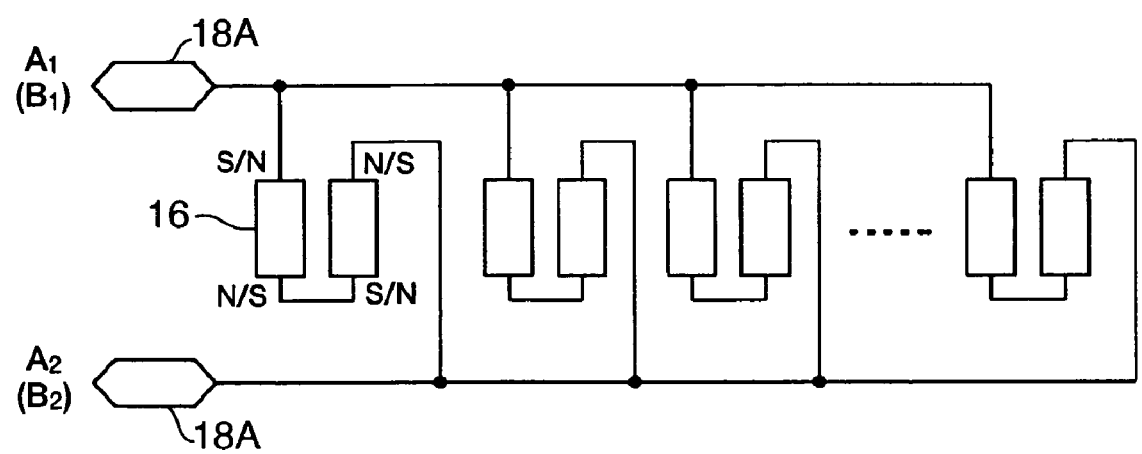

FIG.4
(1)
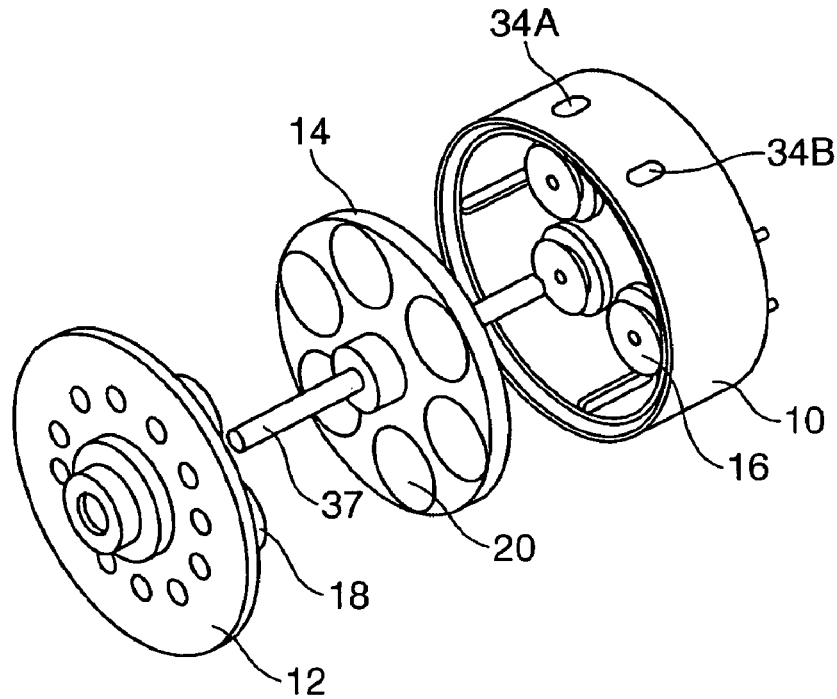
(2)
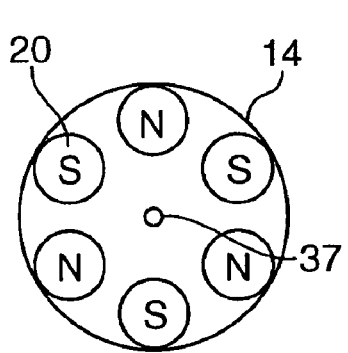
(4)
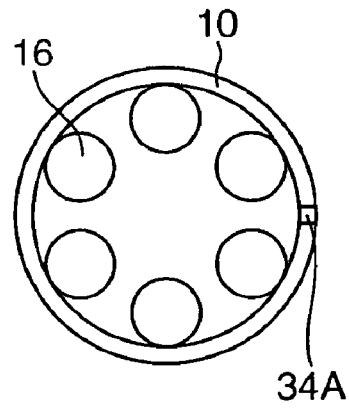
(5)
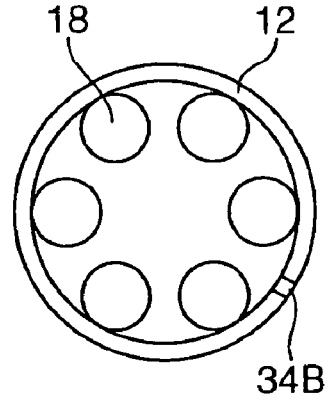
(3)
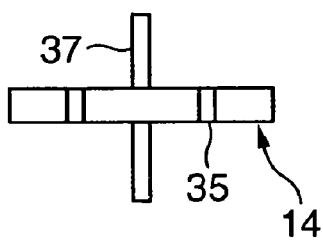

FIG.5
(1)
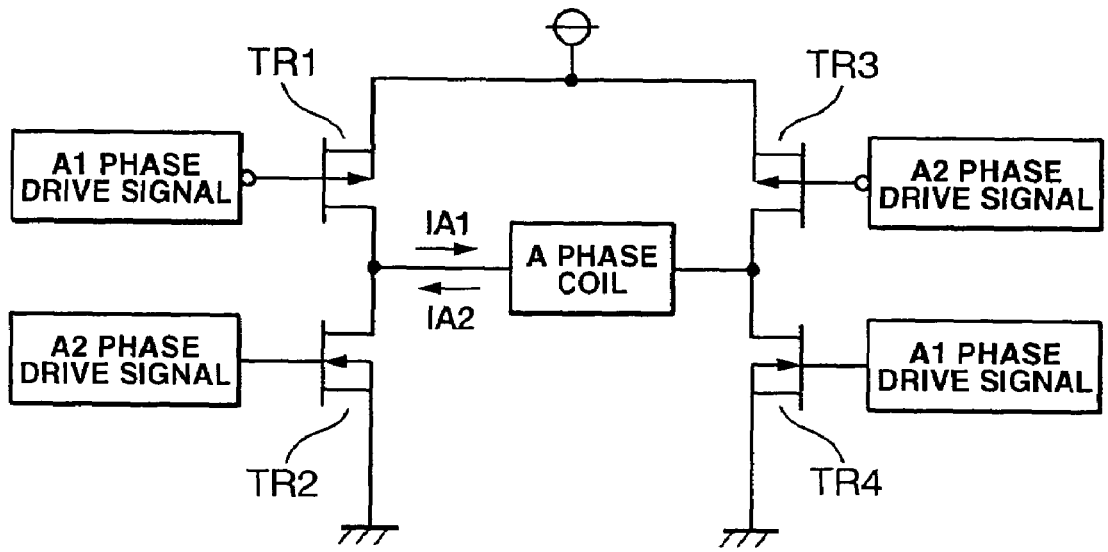
(2)
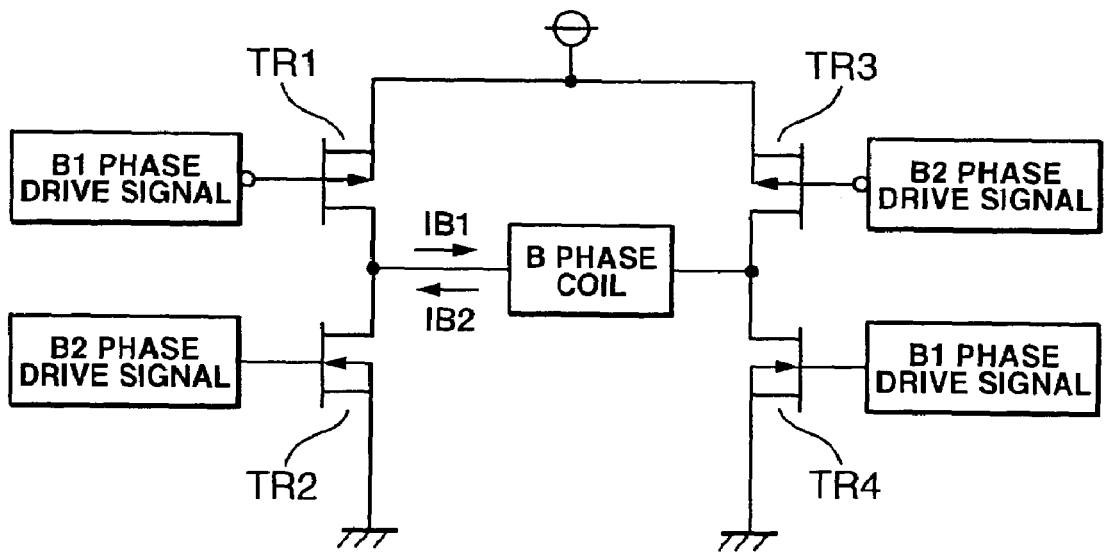

FIG.25
(1)
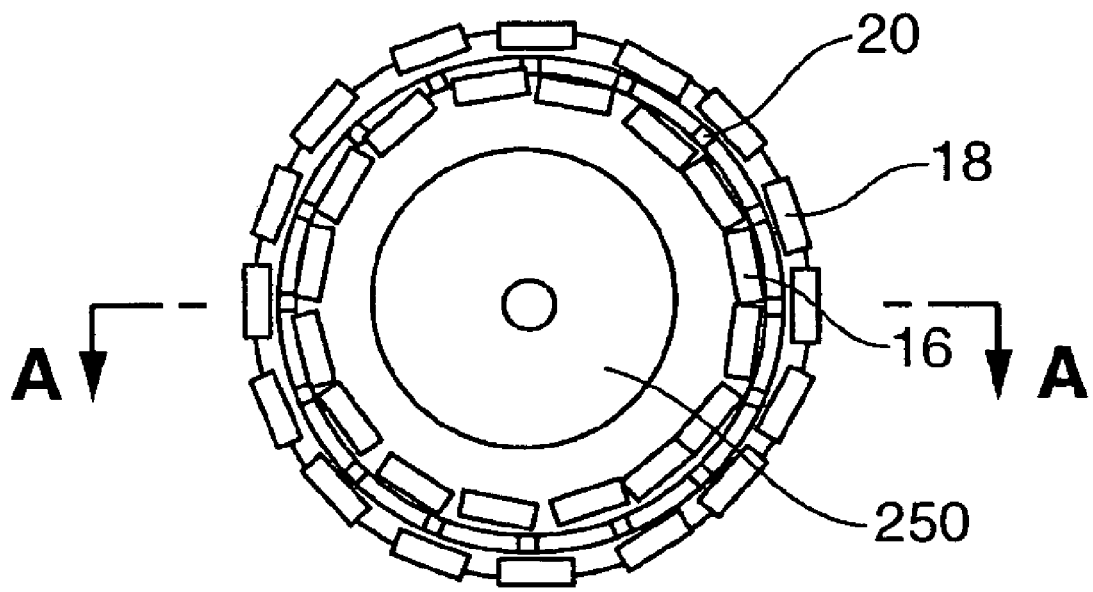
(2)
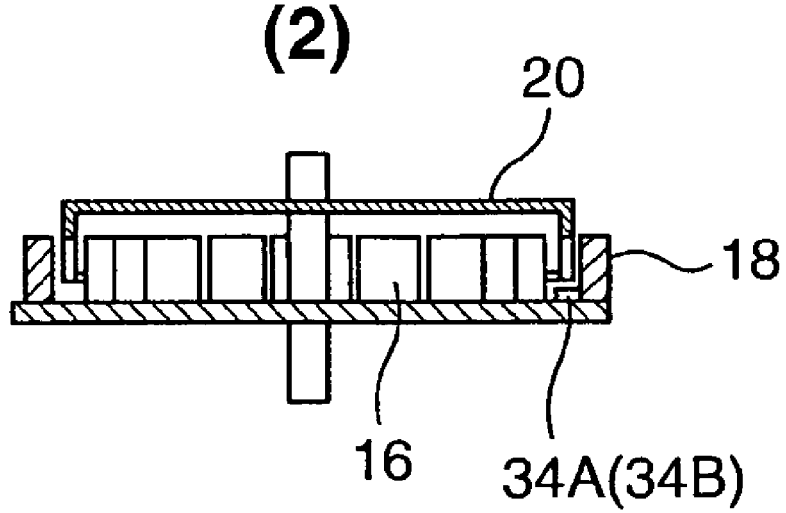

MOTOR AND DRIVE CONTROL SYSTEM THEREOF

CROSS REFERENCE TO RELATED APPLICATIONS

This application is a divisional patent application of U.S. Ser. No. 11/078,960 filed Mar. 11, 2005, now U.S. Pat. No. 7,095,155 claiming priority to Japanese Patent Application No. 2004-071417 filed Mar. 12, 2004, all of which are hereby expressly incorporated by reference.

FIELD OF THE INVENTION

The present invention relates to various motors constituted to rotate a rotor or move a slider formed from a permanent magnet or ferromagnetic material by linearly arranging coils that generate magnetic poles and sequentially switching the current to be applied to the coil, a magnetic structure to be employed in such a motor, and a power driver employing this motor as its drive source. The present invention may be employed in the likes of an electric vehicle, electric cart and electric wheelchair, as well as an electric toy, electric airplane, small electronic appliances and MEMS as the foregoing power driver.

DESCRIPTION OF THE RELATED ART

An AC motor driven with a frequency signal such as an alternating current can be broadly classified into two types; namely, a synchronous motor and an induction motor. A synchronous motor is a motor that uses a layered core of a permanent magnet or a ferromagnetic material such as iron in the rotor, and rotates at a rotation speed that is the same as the speed of the rotating magnetic field determined based on the power supply frequency.

Depending on the type of rotor, there are various types of motors such as a magnetic type which uses a permanent magnet, a coil type with a coil wound thereto, and a reactance type which uses a ferromagnetic material such as iron. Among the above, with the magnetic type motor rotates by the permanent magnet of the rotor being pulled with the rotating magnetic field of the stator. Meanwhile, the induction motor is a motor that rotates by generating a separate magnetic field with the electromagnetic induction effect to a rotor having a box-shaped conduction wire.

Among the foregoing motors, there is a motor that does not rotate, but rather moves linearly or moves freely on a flat surface. This kind of motor is generally referred to as a linear motor, and moves the permanent magnet or ferromagnetic material mounted thereon by linearly arranging coils that generate magnetic poles and sequentially switching the current to be applied to the coil. The linearly disposed coil array is the stator, and the rotor corresponds to a flat slider that slides thereabove.

As a magnetic synchronous motor, for instance, there is a small synchronous motor described in the gazette of Japanese Patent Laid-Open Publication No. H8-51745 (Patent Document 1). This small synchronous motor, as shown in FIG. 1 of Patent Document 1, is constituted by comprising a stator core 6 wound with an excitation coil 7, and a rotor 3 having a rotor core 2 having a magnet 1 build therein and in which the NS poles are aligned in even intervals around the peripheral face thereof.

SUMMARY OF THE INVENTION

Nevertheless, with the motor explained in the description of the related art, the weight became massive in comparison to the generated torque, and there is a problem in that the motor would become enlarged when attempting to increase the generated torque. Thus, an object of the present invention is to provide a motor suitable for miniaturization and superior in torque and weight balance.

In order to achieve the foregoing object, the present invention provides a motor drive system comprising a movable body and a plurality of electromagnetic coils in which the plurality of electromagnetic coils is disposed as a stator in a non-contact manner on the movable body to which a plurality of permanent magnets alternately magnetized at opposite poles is continuously disposed thereon, and the movable body is capable of moving based on the attraction—repulsion between the movable body and electromagnetic coils generated by supplying an excitation current as a direct drive waveform to the electromagnetic coils; wherein a sensor for detecting the periodical magnetic field change caused by the movement of the permanent magnet is provided, and the output of the sensor is directly supplied as the excitation current to the electromagnetic coils.

In a preferred embodiment of the present invention, the movable body is constituted to have a plurality of constitutions in which the heteropolar arrangement of two different permanent magnets constitutes a pair, and, when the position between the heteropolar arrangement constituting a pair is $2\pi$, the sensor is able to linearly detect the arbitrary position between the $2\pi$, and the sensor is provided to the electromagnetic coil phase.

Also provided is a motor drive system provided with a movable body constituted to have a plurality of constitutions in which the heteropolar arrangement of permanent magnets constitutes a pair, in which the position between the heteropolar arrangement constituting a pair is set to $2\pi$, and the movable body is moved based on the attraction—repulsion with non-contact electromagnetic coils; wherein the sensor is able to linearly detect the arbitrary position between the $2\pi$, and the sensor is provided to the electromagnetic coil phase. The arbitrary position signal level obtained from the sensor corresponding to the electromagnetic coil phase is returned to the electromagnetic coils.

The present invention also provides a motor comprising magnetic polar means in which a permanent magnetic polar array having arranged therein alternately a plurality of permanent magnetic polar elements in alternate opposite poles is made to face a plurality of electromagnetic coil arrays alternately excited at opposite poles, and the permanent magnetic polar array is made to move thereby; wherein the motor further comprises a sensor for detecting the periodical magnetic change accompanying the movement of the permanent magnetic polar array, and the output of the sensor is directly returned to the electromagnetic coils. In a more detailed embodiment of the present invention, the coil array is formed from a two-phase pair of A and B phases, the permanent magnetic polar array is interposed between the A and B phases, A and B phases shift the phase for establishing the coil, a sensor for the A phase coil and a sensor for the B phase coil are provided, and the phase for establishing the A phase coil sensor and the B phase coil sensor is shifted. A plurality of patterns of excitation signals is supplied respectively to the A phase coil and the B phase coil. Regardless of at which position the permanent magnetic polar array is stopped, at least one signal among the plurality of patterns of excitation signals is set to be the excitation state based on the output from the A phase sensor and the B phase sensor. The sensor is a hall element sensor for outputting an analog detection value. PWM control is added to the sensor output value based on the drive request torque of the motor, and the control signal is supplied to the excitation coils.

The present invention further provides a motor regenerative drive system to be used in the regeneration of the motor, wherein provided is regeneration control means for controlling the regeneration based on the sensor signal, and the control means has means for forming a regenerative enabling signal from the sensor signal, means for controlling the duty of the regenerative enabling signal based on the load status, and means for arbitrarily controlling the regeneration of the motor based on the duty.

BRIEF DESCRIPTION OF THE DRAWINGS

FIG. 3 is an equivalent circuit diagram showing the connection state of the electromagnetic coils;

FIG. 4 is a perspective view of the motor;

FIG. 5 is a block diagram of the drive circuit for supplying an excitation signal to a coil array;

FIG. 25 is a diagram showing the structure where the respective phase coils and the rotor, which is formed from a permanent magnet, are facing each other in the radial direction.

DETAILED DESCRIPTION OF THE PREFERRED EMBODIMENTS

Figure 1:
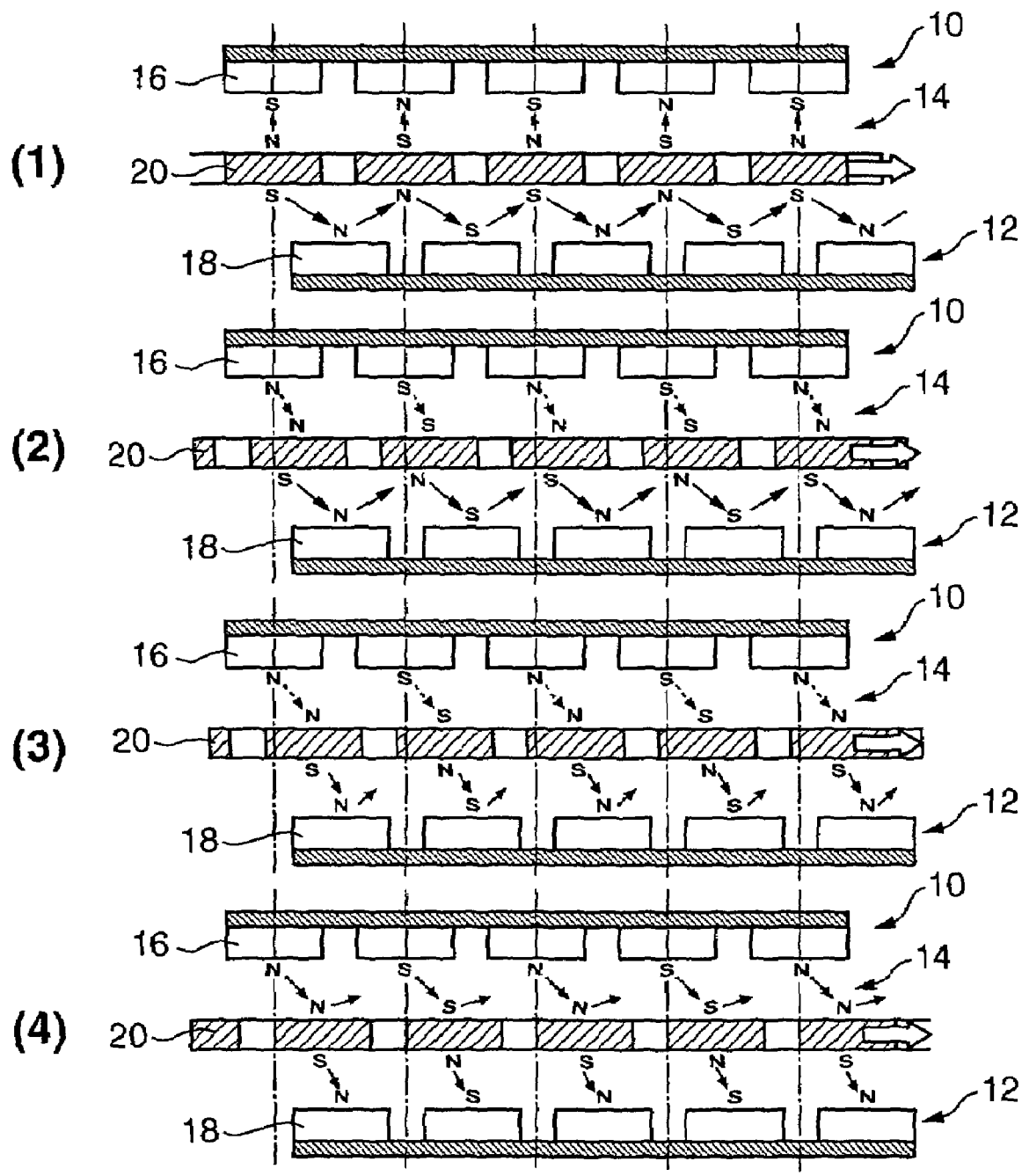
FIG. 1 is a diagram showing the frame format and principle of operation of the magnetic structure pertaining to the present invention.
Figure 2:
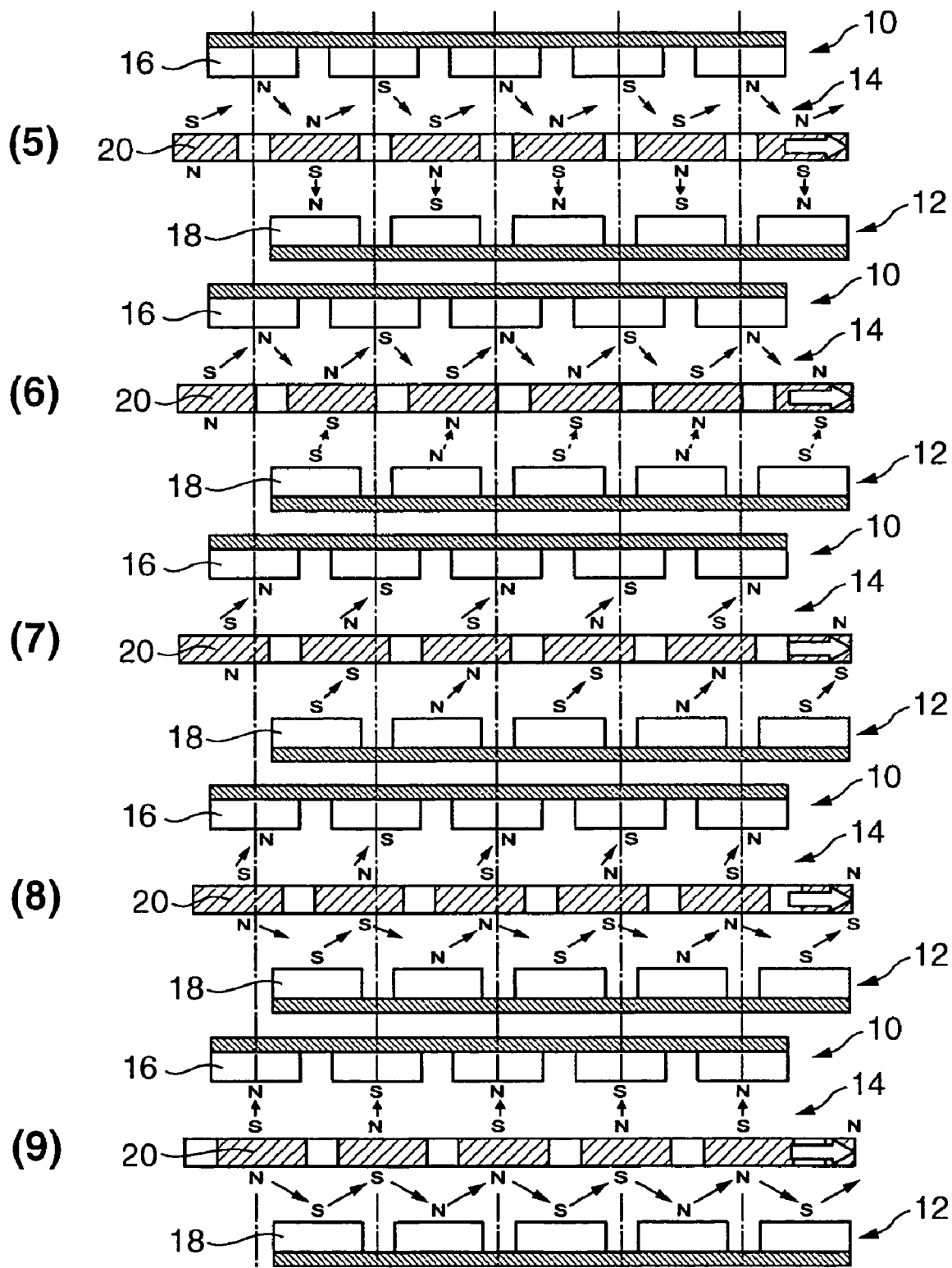
FIG. 2 is a diagram showing the principal of operation subsequent to FIG. 1.

FIG. 1 and FIG. 2 are diagrams showing the principal of operation of the motor pertaining to the present invention. This motor has a constitution where a third permanent magnet 14 is interposed between a first coil pair (A phase coil) 10 and a second coil pair (B phase coil) 12. The coils and permanent magnet may be constituted circularly (arc, circle) or linearly. When formed circularly, either the permanent magnet or the coil phase functions as the rotor, and, when formed linearly, one of the above becomes a slider.

A first coil pair 10 comprises a constitution in which the coils 16 alternately excitable to the opposite poles are sequentially aligned in a prescribed spacing, preferably an even spacing. FIG. 5 is an equivalent circuit diagram of this first coil pair. According to FIG. 1 and FIG. 2, as described later, with a two-phase excitation coil, all coils are excited to be constantly driven against the two-phase exciting coil during the start-up rotation ($2\pi$) with the foregoing polarity. Therefore, a drivee means such as a rotor or slider can be rotated and driven at high torque.

As shown in FIG. 3(1), a plurality of electromagnetic coils 16 (magnetic unit) to be alternately excited at opposite poles is connected serially in even spacing. Reference numeral 18A is a block showing the drive circuit for applying a frequency pulse signal to these magnetic coils. When an excitation signal for exciting the coils is sent from the excitation circuit to the electromagnetic coils 16, the respective coils are pre-set to be excited such that the direction of the magnetic poles will alternate between the adjacent coils. As shown in FIG. 3(2), the electromagnetic coils 16 may also be connected in parallel. The structure of these coils are the same for both A and B phase coils.

When a signal having a frequency for alternately switching, in prescribed cycles, the direction of the polarity of the supplied excitation current is applied from the excitation circuit 18A to the electromagnetic coils 16, as shown in FIG. 1 and FIG. 2, a magnetic pattern which alternately changes the polarity on the side facing the rotor 14 from N pole→S pole→N pole is formed in the A phase coil pair 10. When the frequency signal becomes a reverse polarity, a magnetic pattern is generated for alternately changing the polarity, which is on the third magnetic body side, of the first magnetic body from S pole→N pole→S pole. As a result, the excitation pattern appearing in the A phase coil pair 10 will periodically change.

Although the structure of the B phase coil pair is the same as the A phase coil pair, the electromagnetic coils 18 of the B phase coil pair differs with respect to the point that it is aligned by being positionally shifted in relation to the [electromagnetic coils] 16 of the A phase coil pair. In other words, the array pitch of the coil in the A phase coil pair and the array pitch of the B phase coil pair are disposed in an offset so as to have a prescribed pitch difference (angular difference). This pitch difference is preferably the (single rotation) of the angle in which the permanent magnet 14 moves corresponding to 1 cycle ($2\pi$) of the excitation current frequency in relation to the coils 16, 18; for instance $\pi/6$ ($\pi/(2/M)$: M is the number of sets of permanent magnet (N+S) where M=3).

The permanent magnet is now explained. As depicted in FIG. 1 and FIG. 2, the rotor 14 formed from a permanent magnet is disposed between a two-phase coil pair, and a plurality of permanent magnets 20 (marked out in black) having alternately reverse polarities is aligned in a line (linearly or in an arc) in prescribed spacing, preferably in even spacing. An arc shape includes loops such as a perfect circle or an oval shape, as well as indefinite circular structures, half circles, fan shapes, and so on.

The A phase coil pair 10 and B phase coil pair 12 are disposed via equal spacing, and a third magnetic body 14 is disposed between the A phase coil pair and B phase coil pair. The array pitch of the permanent magnet 20 is roughly the same as the array pitch of the magnetic coil in the A phase coil 10 and B phase coil 12.

Next, the operation of the magnetic structure in which the foregoing third magnetic body is disposed between the first magnetic body 10 and second magnetic body 12 is explained with reference to FIG. 1 and FIG. 2. Let it be assumed that, based on the foregoing excitation circuit (reference numeral 18 illustrated in FIG. 3; to be described in detail later), the excitation pattern shown in FIG. 1(1) is being generated at a certain moment in the electromagnetic coils 16, 18 of the A phase coil and B phase coil.

Here, a magnetic pole in the pattern of →S→N→S→N→S→is generated in the respective coils 16 on the surface facing the side of the permanent magnet 14 of the A phase coil 10, and a magnetic pole in the pattern of →N→S→N→S→N→is generated in the coil 18 on the surface facing the side of the permanent magnet 14 of the B phase coil 12. In the diagrams, the magnetic relation between the permanent magnet and the respective phase coils is illustrated, and a repulsive force will arise between the same poles and an attractive force will arise between opposite poles.

The next instant, as shown in FIG. 1(2), when the polarity of the pulse wave applied to the A phase coil via the drive circuit 18 is reversed, a repulsive force will arise between the magnetic pole generated to the coils 16 of the A phase coil 10 and the magnetic pole of the permanent magnet 20. Meanwhile, since an attracting force is generated between the magnetic pole generated to the coils 18 of the B phase coil 12 and the magnetic pole on the surface of the permanent magnet, as shown in FIG. 1(1) to FIG. 2(5), the permanent magnet 14 will sequentially move rightward in the diagram.

A pulse wave having a phase lag in comparison to the exciting current of the A phase coil applied to the coils 18 of the B phase coil 12, and, as shown in FIG. 2(6) to (8), the magnetic pole of the coils 18 of the B phase coil 12 and the magnetic pole on the surface of the permanent magnets 20 repel against each other, and move the permanent magnet 14 further rightward. FIG. 1(1) to FIG. 2(8) illustrate a case where the rotor 14 engages in a rotation corresponding to π, and FIG. 3(9) onward illustrate a case where such rotor 14 engages in a rotation corresponding to π→2π. As described above, the rotor will rotate by supplying a drive current (voltage) signal of a prescribed frequency with a shifted phase to the A phase coil array and B phase coil array.

When the A phase coil array, B phase coil array and the permanent magnet are formed in an arc, the magnetic structure depicted in FIG. 1 will become a structure of a rotating motor, and, when these are formed linearly, the magnetic structure thereof will become a linear motor. Excluding the portions of the permanent magnet such as a case or rotor and the electromagnetic coil can be reduced in weight by employing a non-magnetic body such as resin (including carbon) or ceramics, and a rotating power drive superior in a power-weight ratio can be realized without generating iron loss as a result of opening the magnetic circuit without using a yoke.

According to this magnetic structure, since the permanent magnet is able to move upon being subject to the magnetic force from the A phase coil and the B phase coil, the torque upon moving the permanent magnet will increase, and, since the torque/weight balance will become superior, a small motor capable of driving at a high torque can be provided thereby.

FIG. 3(1) shows the respective circuits of the A phase coil and B phase coil in a case where the plurality of coil arrays is formed serially, and FIG. 3(2) shows the respective circuits of the A phase coil and B phase coil in a case where the plurality of coil arrays is formed in parallel.

FIG. 4 is a perspective view of the motor, wherein FIG. 4(1) is a perspective view of the motor; FIG. 4(2) is a schematic plan view of the rotor (third magnetic body); FIG. 4(3) is a side view thereof; FIG. 4(4) is a diagram showing an A phase electromagnetic coil (first magnetic body); and FIG. 4(5) is a diagram showing a B phase electromagnetic coil (second magnetic body). The reference numerals used in FIG. 4 are the same as the structural components corresponding to the foregoing diagrams.

The motor comprises a pair of A-phase magnetic body 10 and B-phase magnetic body 12 corresponding to a stator, as well as the third magnetic body 14 constituting the rotor, and a rotor 14 is rotatably disposed around the axis 37 and between the A-phase magnetic body and B-phase magnetic body. The rotating axis 37 is fitted into an opening in the center of the rotor such that the rotor and rotating axis can rotate integrally. As shown in FIGS. 4(2), (4) and (5), six permanent magnets are provided to the rotor in even spacing around the circumferential direction thereof, polarities of the permanent magnets are made to be mutually opposite, and six electromagnetic coils are provided to the stator in even spacing around the circumferential direction thereof.

The A phase sensor 34A and B phase sensor 34B are provided to the inner side wall of the case of the A phase magnetic body (first magnetic body) via a phase shift (distance corresponding to π/6). The A phase sensor 34A and B phase sensor 34B are subject to mutual phase shifts for providing a prescribed phase different to the frequency signal to be supplied to the A phase coil 16 and the frequency signal to be supplied to the B phase coil 18.

As the sensor, it is preferable to use a hall element employing the hall effect and which is capable of detecting the position of the permanent magnet from the change in the magnetic pole pursuant to the movement of the permanent magnet. As a result of employing this sensor, when the S pole of the permanent magnet to the subsequent S pole is set to 2π, the hall element will be able to detect the position of the permanent magnet regardless of where the permanent magnet is located. As the hall element, a method of generating a pulse may be employed, or a method of outputting an analog value according to the magnetic pole intensity may also be employed.

FIG. 5(1) and FIG. 5(2) respectively show the drive circuits of the A phase magnetic body formed from an A phase coil array and the B phase magnetic body formed from a B phase coil array.

This circuit includes switching transistors TR1 to TR4 for applying the output waveform of the sensor as an excitation current to the A phase electromagnetic coil or B phase electromagnetic coil. Here, when the A phase sensor output as the signal is "H", "L" is applied to the TR1 gate, "L" is applied to the TR2 gate, "H" is applied to the TR3 gate, and "H" is applied to the TR4 gate. Then, TR1 and TR4 will be turned on, and the excitation current as the output from the sensor having an IA1 is applied to the A phase coil. Meanwhile, when then A phase sensor output as the signal is "L", "H" is applied to the TR1 gate, "H" is applied to the TR2 gate, "L" is applied to the TR3 gate, and "L" is applied to the TR4 gate. Then, TR2 and TR3 will be turned on, and the excitation current having an IA2 orientation will be applied to the A phase coil. Further, when "H" is applied to TR1 and TR3 and "L" is applied to TR2 and TR4, this will enter an HiZ state, and current will not be supplied to the electromagnetic coil. The same applies regarding the excitation to the B phase coil illustrated in FIG. 5(2).

Figure 6:
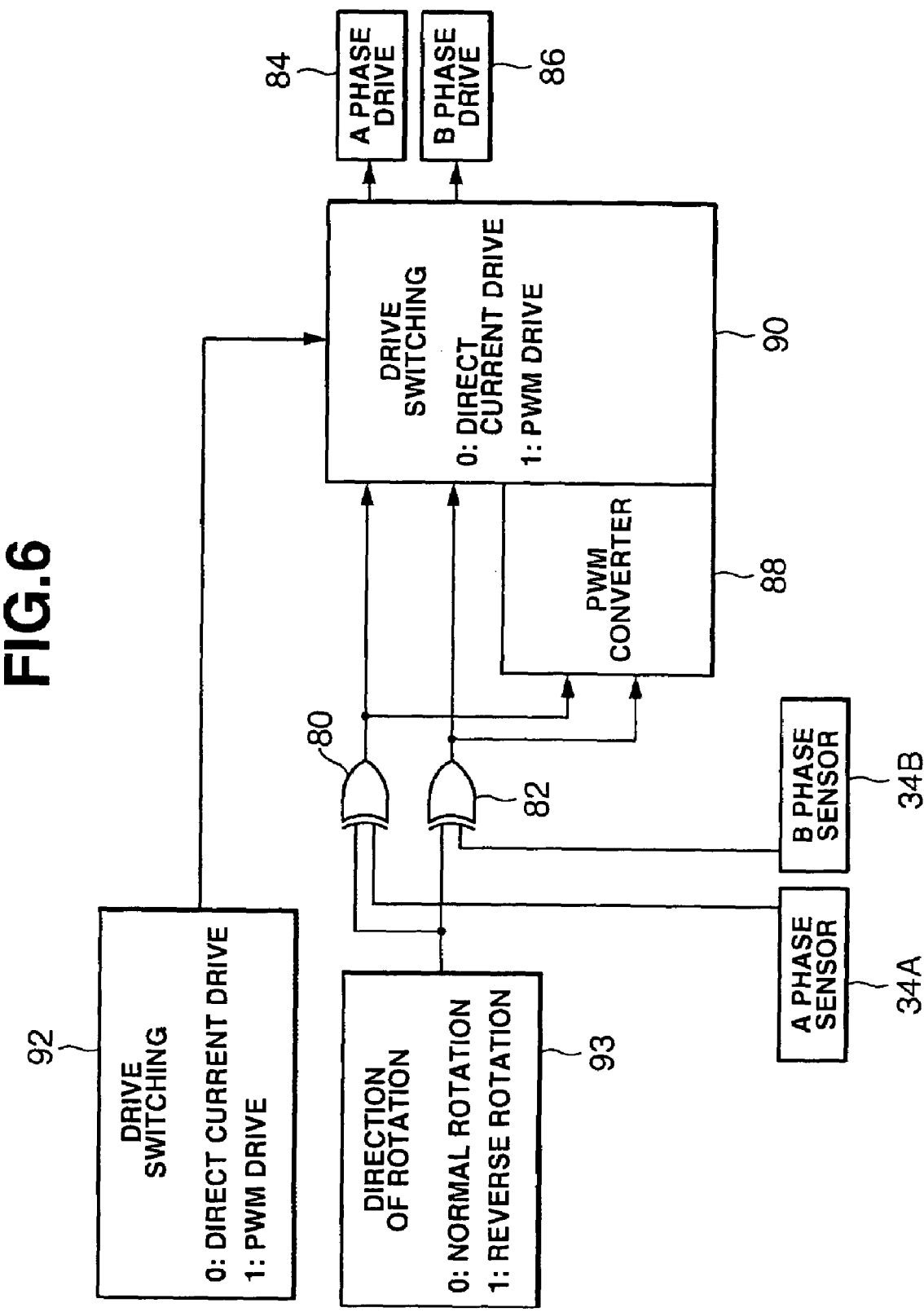
FIG. 6 is a control circuit block diagram for returning the digital output of the sensor directly to the coil drive circuit.

FIG. 6 is a processing circuit of the control signal supplied to the A phase drive circuit and B phase drive circuit. The digital output from the A phase sensor 35A is supplied to the EX-NOR gate 80, and the digital output from the B phase sensor 35B is supplied to the EX-NOR circuit 82. Reference numeral 92 is a formation means of the control signal for selecting whether to supply the output from the sensor to the foregoing drive circuit as is, or to change (PWM) the duty of the sensor output value, and reference numeral 93 is a formation of the control signal for determining whether to make the direction of rotation of the rotor formed from a permanent magnet a normal rotation or a reverse rotation. Either pattern (polarity) of the A phase coil and B phase coil may be reversed for normal rotation and reverse rotation. Each of these means is realized with a microcomputer. Reference numeral 88 is the PWM converter, and is capable of controlling the motor torque by converting and controlling the analog quantity from the sensor output into a logic quantity via PWM control (current control). Reference numeral 90 is a switching circuit unit for switching the selection of the signal formed with the PWM converter 88 or the signal directly obtained from the sensor, and supply thereof to the A phase drive 84 or B phase drive 86.

Figure 7:
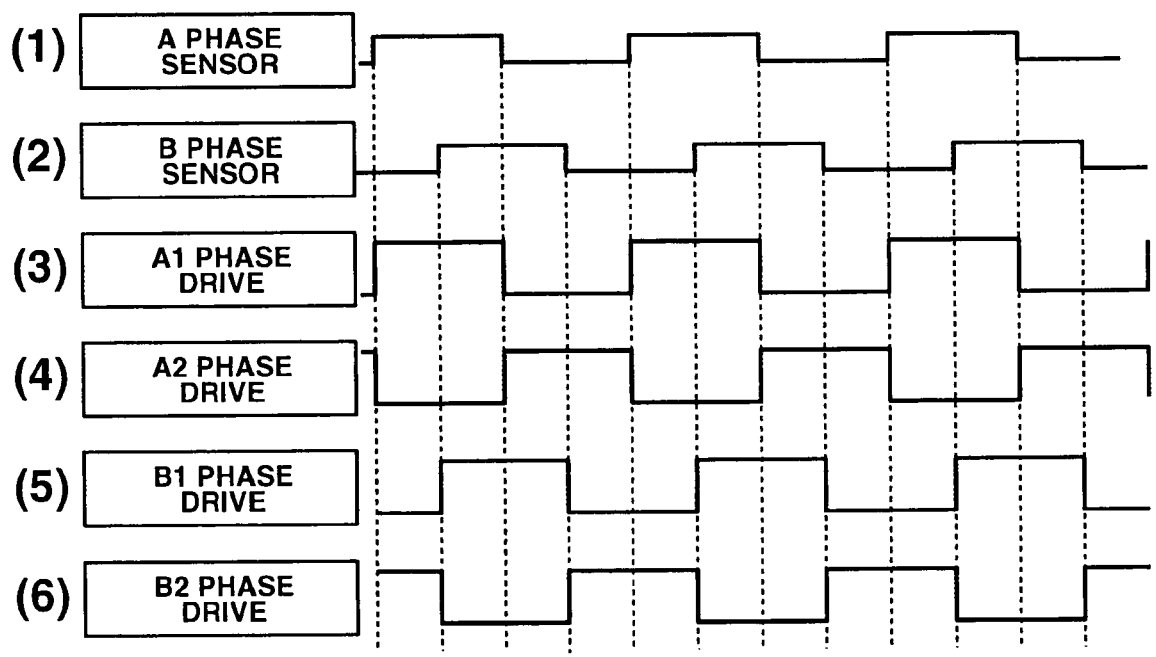
FIG. 7 is the control waveform diagram thereof.

FIG. 7 is a diagram showing the output waveforms of the respective phase sensors and the excitation signal pattern to be supplied to the drive circuits of the respective phase coils. As a result of the established position phase of the A phase sensor and B phase sensor being mutually shifted, a phase difference in the output value thereof will also become apparent. The control circuit of 8 described above directly supplies the output (1) of the A phase sensor as a direct drive waveform to the driver 84 of the A phase coil. The A1 phase drive waveform (3) is the control signal having the current orientation of terminal A1→terminal A2 of the A phase coil array depicted in FIG. 5, and A2 phase drive waveform (4) is the control signal having the current orientation of A2 terminal→A1 terminal. As shown in FIG. 5, a plurality of coil excitation patterns of the A1 phase waveform and A2 phase waveform is formed from the A phase sensor output, and this is output to the excitation circuit (coil drive circuit). The same applies for the B phase coil. FIG. 7 illustrates a case of directly supplying the sensor output to the drive circuit.

Regardless of the position of the permanent magnet of the rotor, even assuming that the A phase sensor output and B phase sensor output are both "L", since the respective levels of the A2 phase drive waveform and B2 phase waveform are "H", as a result of this being supplied to the drive circuit, the A phase coil array and B phase coil will both be excited, and try to rotate the rotor comprising the permanent magnet. In other words, regardless of at which position the permanent magnet is stopped, the rotation of the rotor can be started by directly returning the sensor output to the driver. As described above, since the sensor output can be directly returned to the drive circuit, it is possible to simplify the constitution of the control circuit.

Figure 8:
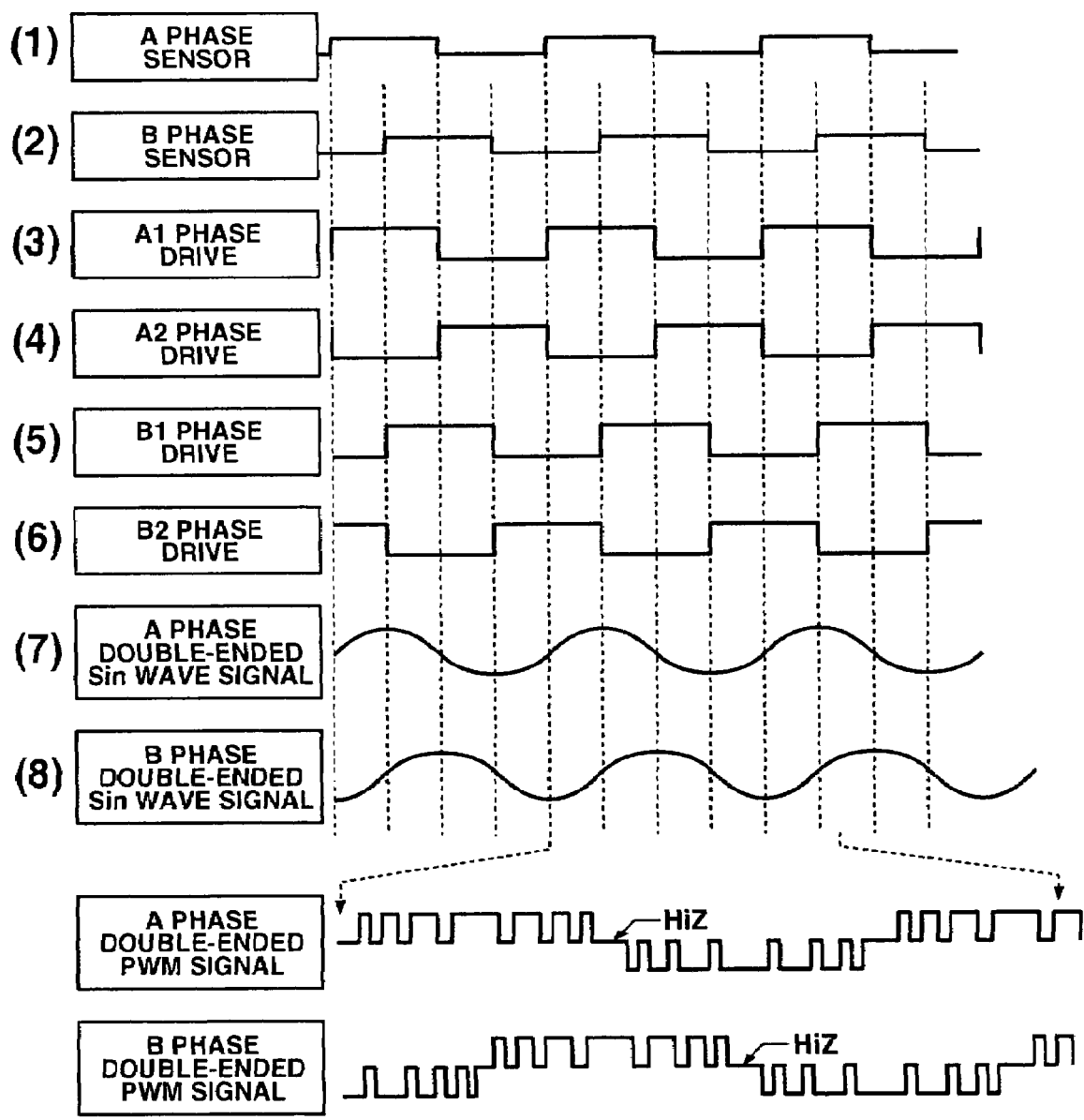
FIG. 8 is a waveform diagram showing the PWM control processing operation from the digital output of the sensor.

FIG. 8 is a control waveform diagram showing the coil array being subject to PWM drive. FIG. 8(1) to (6) are the same as FIG. 7. FIG. 8(7) shows the sinusoidal wave output to be applied to both ends of the potential of the A phase coil array, and the frequency of this sinusoidal wave will change pursuant to the duty command value. As a result of acquiring this sinusoidal wave output and the AND of the digital output value (synthesis of (1) and (3)) of both ends of the A phase coil, the output value of the A phase coil can be subject to duty conversion. The same applied to the B phase coil array.

Figure 9:
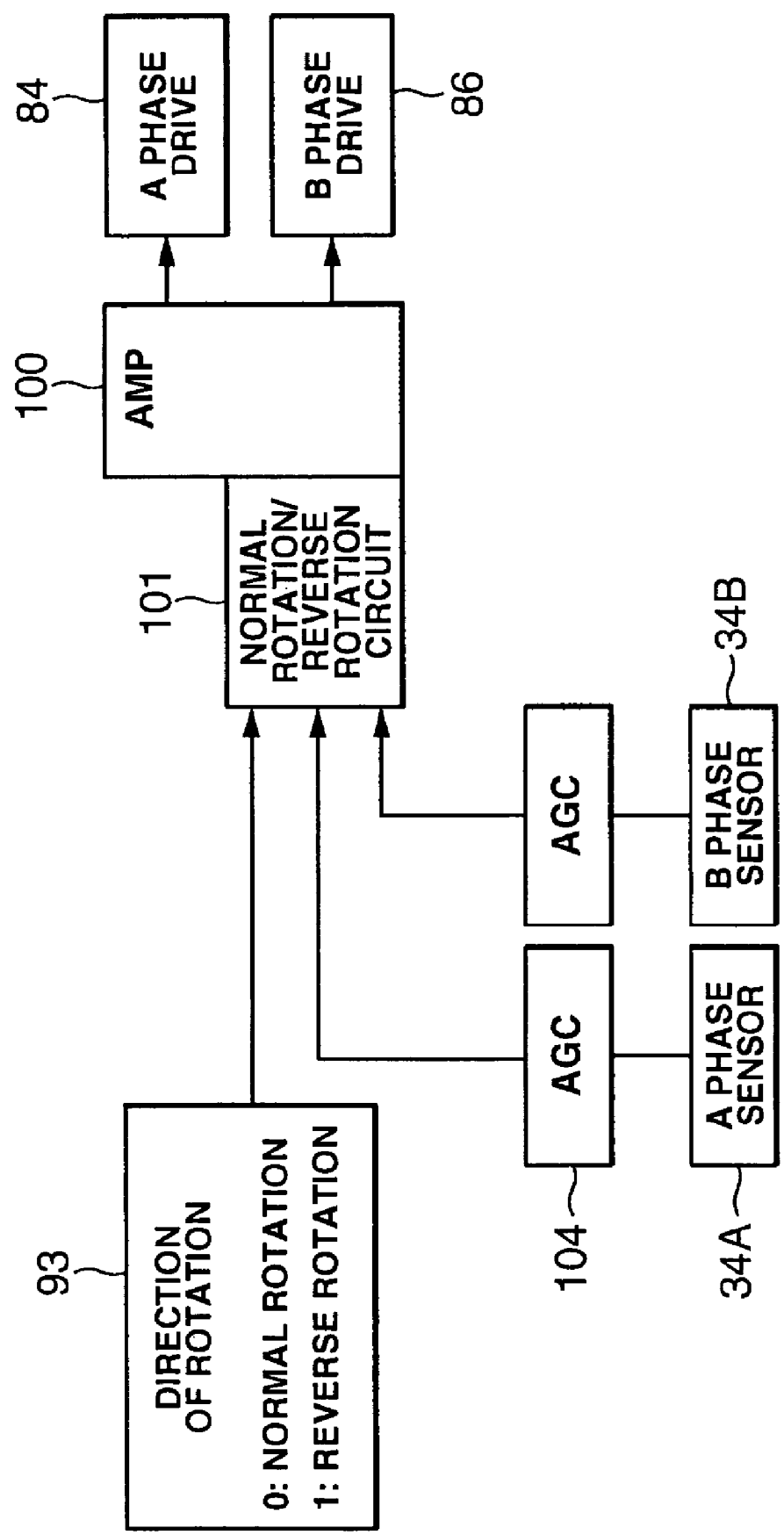
FIG. 9 is a control circuit block diagram for returning the analog output of the sensor directly to the coil drive circuit.
Figure 10:
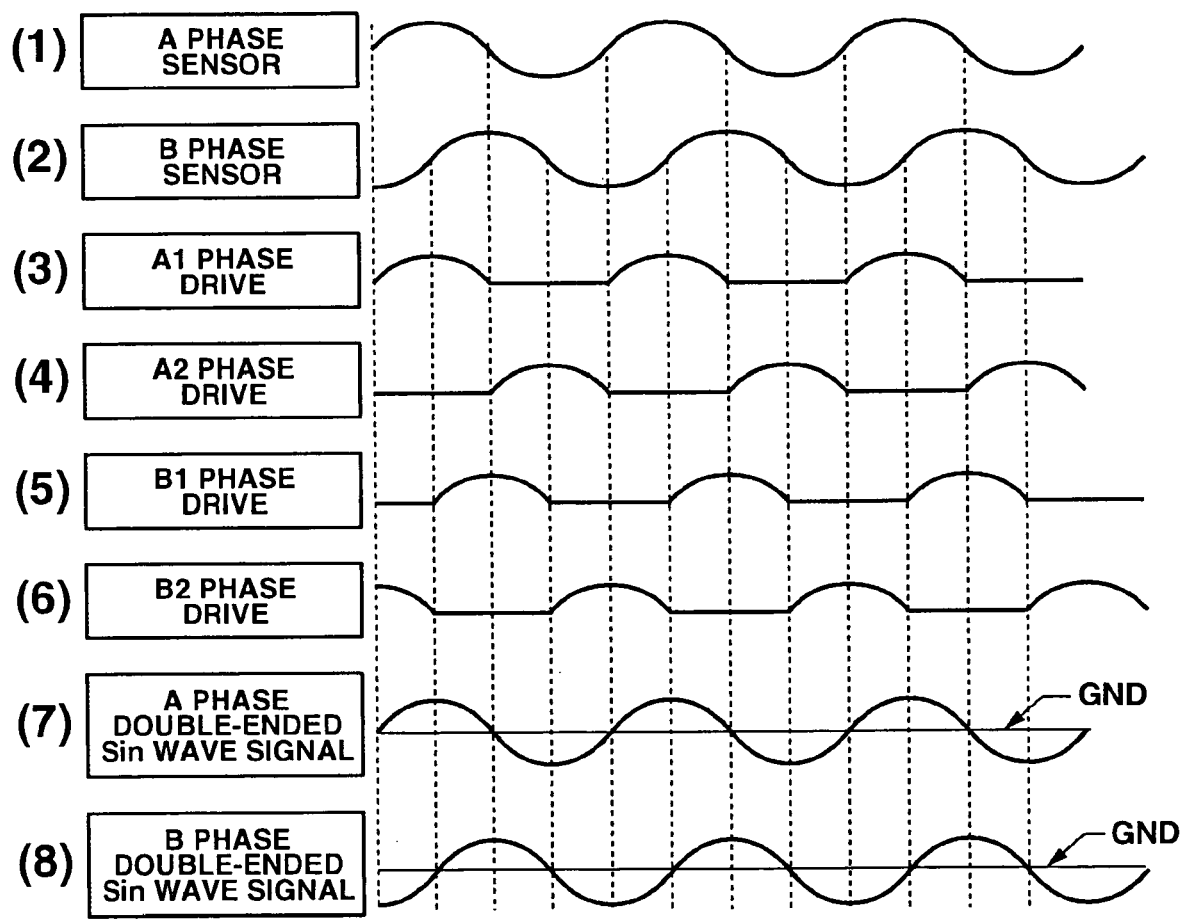
FIG. 10 is the control waveform diagram thereof.

FIG. 9 is a control circuit for directly driving the driver with an analog sensor; that is, a block diagram showing the analog output value of the sensor being directly supplied to the excitation coil. Reference numeral 100 is an amplifier of the sensor output. The polarity of the sensor output is controlled based on the normal rotation/reverse rotation circuit 101 of the rotor. Reference numerals 102 and 104 are auto gain controls. FIG. 10 is a diagram showing the analog output value of the respective phase sensors, and the drive voltage waveform of the respective phase coil arrays to which this analog output value has been supplied.

Figure 11:
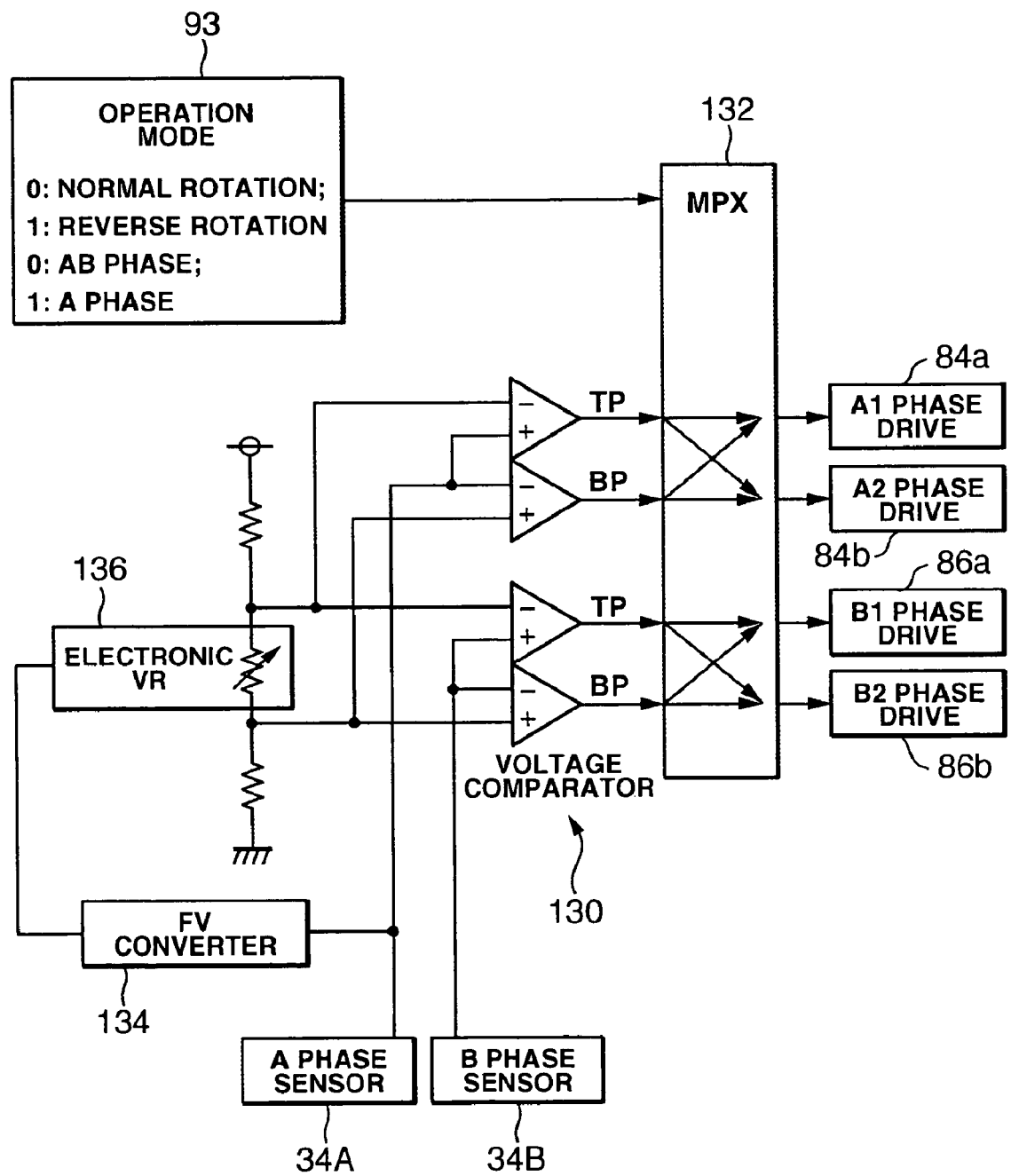
FIG. 11 is a control circuit block diagram for achieving the control of the hysteresis level in relation to the analog output value of the sensor.

FIG. 11 is a diagram showing the digital drive circuit based on an analog sensor, and reference numeral 130 is a voltage comparator employing a circuit constitution pertaining to the reverse signal obtained from the window comparator as an example of the hysteresis level setting means (hereinafter referred to as the "window comparator"), and the hysteresis level is determined by the output of the A phase sensor 35A and the output of the B phase sensor 35B being input and compared with the input value of the variable resistance control circuit 136. Reference numeral 132 is a switch circuit for switching whether to control A coil with the A1 phase drive waveform 84A or the A2 phase drive waveform, and the same applies to the B phase coil. Reference numeral 134 is the FV converter for converting the frequency of the output value of the A phase sensor into a voltage value, and, by supplying this to the electronic VR control circuit 136, the value of resistance is determined, and the hysteresis level is set. In other words, as a result of making the hysteresis level variable, the duty of the rectangular wave is changed, and the torque control of the motor characteristics is enabled. For example, upon starting the motor, the hysteresis level is set to minimum, and the motor is driven giving preference to the torque and sacrificing the efficiency. Further, when the motor is in a state of operational stability, the hysteresis level is set to maximum to drive the motor giving preference to high efficiency. The hysteresis adjustment volume (v) may also be controlled with the CPU. The control circuit 93 offers the selection of the mode of exciting the A phase coil and B phase coil and rotating the rotor, and the mode of exciting either phase and rotating the rotor.

Figure 12:
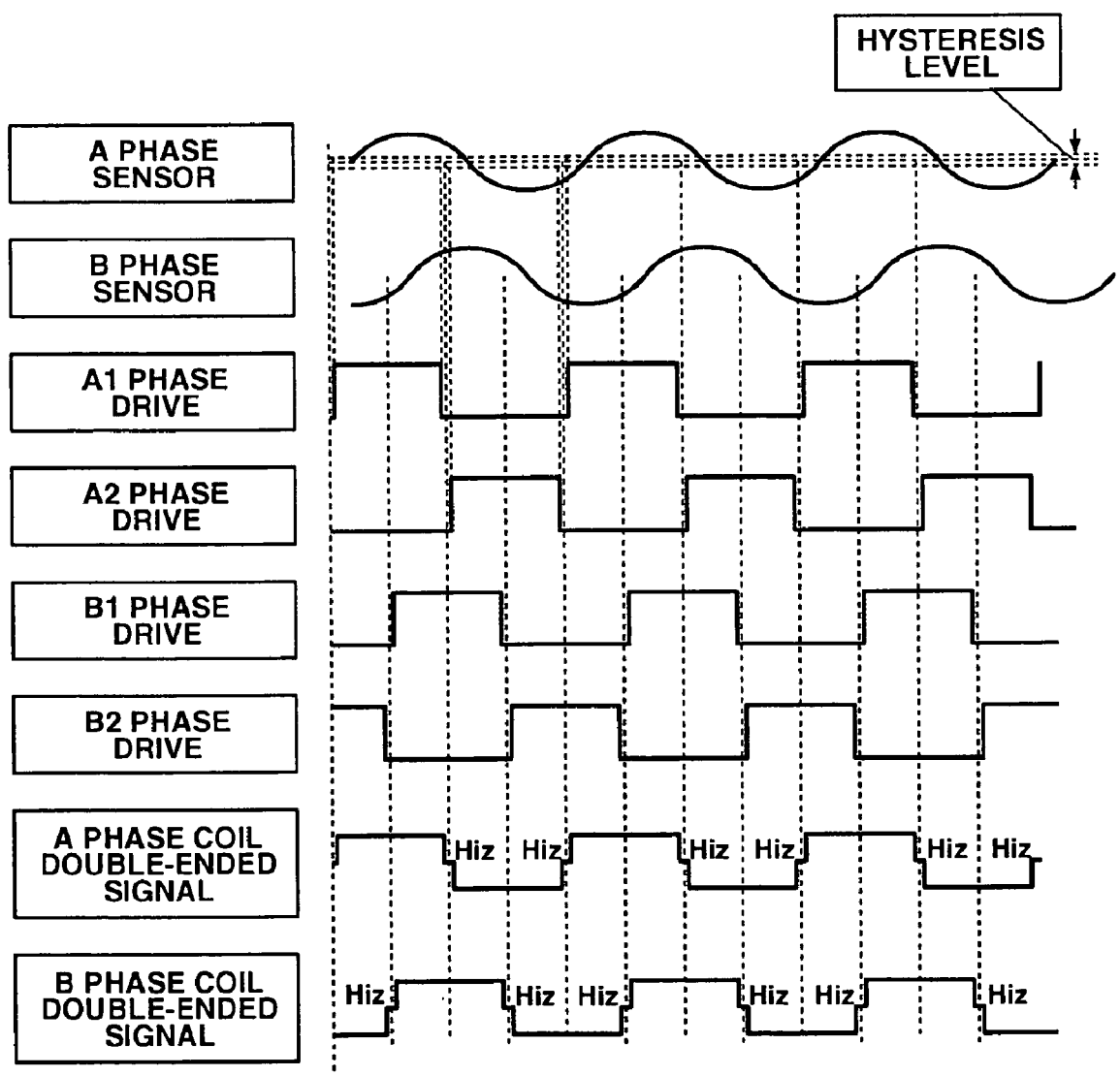
FIG. 12 is a control waveform diagram in the case when the hysteresis level is small.
Figure 13:
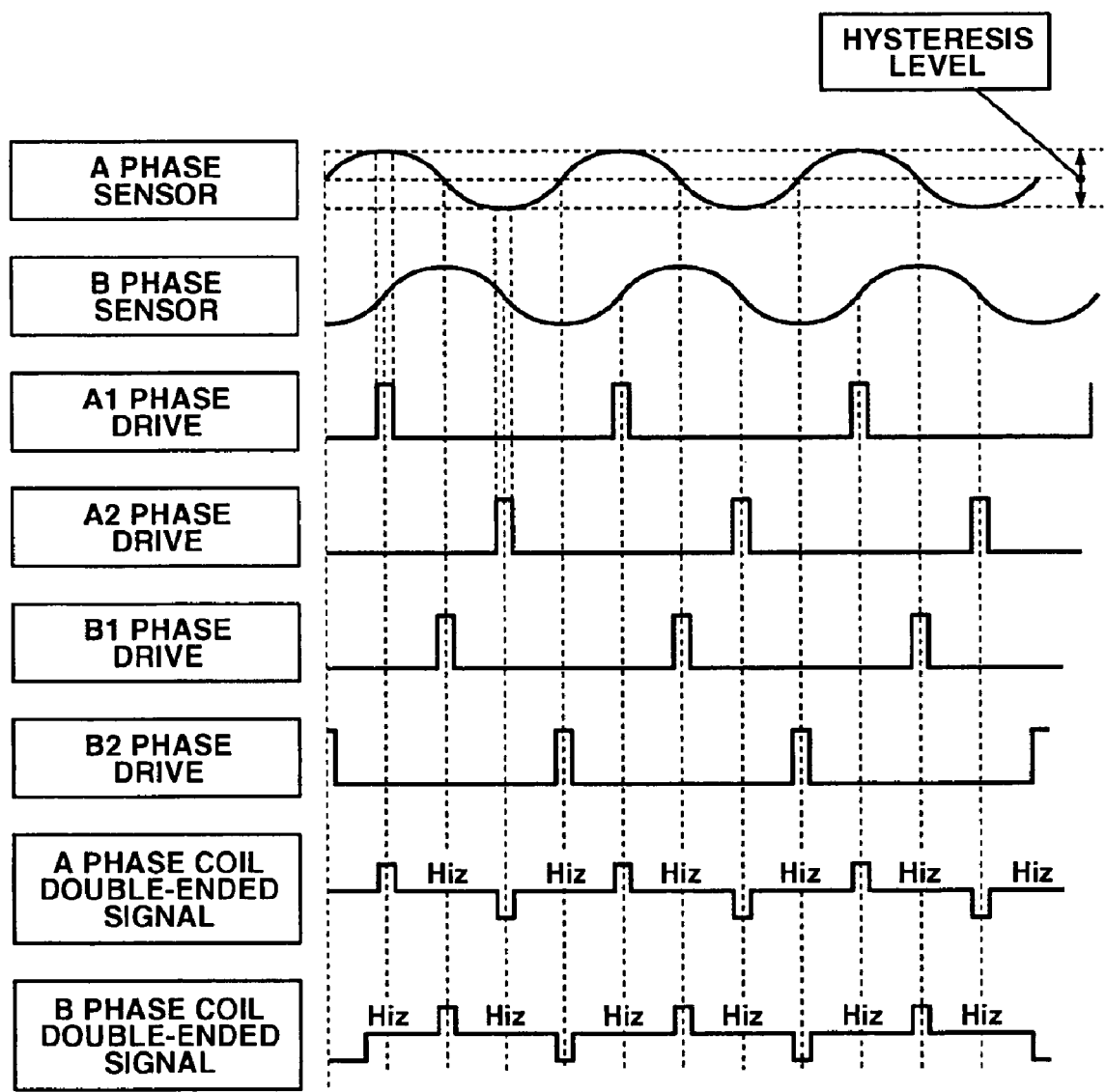
FIG. 13 is a control waveform diagram in the case when the hysteresis level is large.

FIG. 12 is control waveform diagram in a case of attempting to rotate the rotor in a stopped state, and, when the hysteresis level is set to minimum, the window comparator 130 compares the sensor output value and hysteresis level, the output value of the sensor is converted into a logic quantity, an excitation signal of a high duty ratio is switched and supplied to from the multiplexer 132 to the A phase coil array and B phase coil array, and the motor attempts to rotate at a high torque. As shown in FIG. 13, when the hysteresis level is set to maximum in a state where the rotor is rotating stably, an excitation signal of a low duty ratio is applied to the respective phase coil arrays, and the drive torque of the motor will decrease. Nevertheless, the motor can be operated at a high efficiency.

Figure 14:
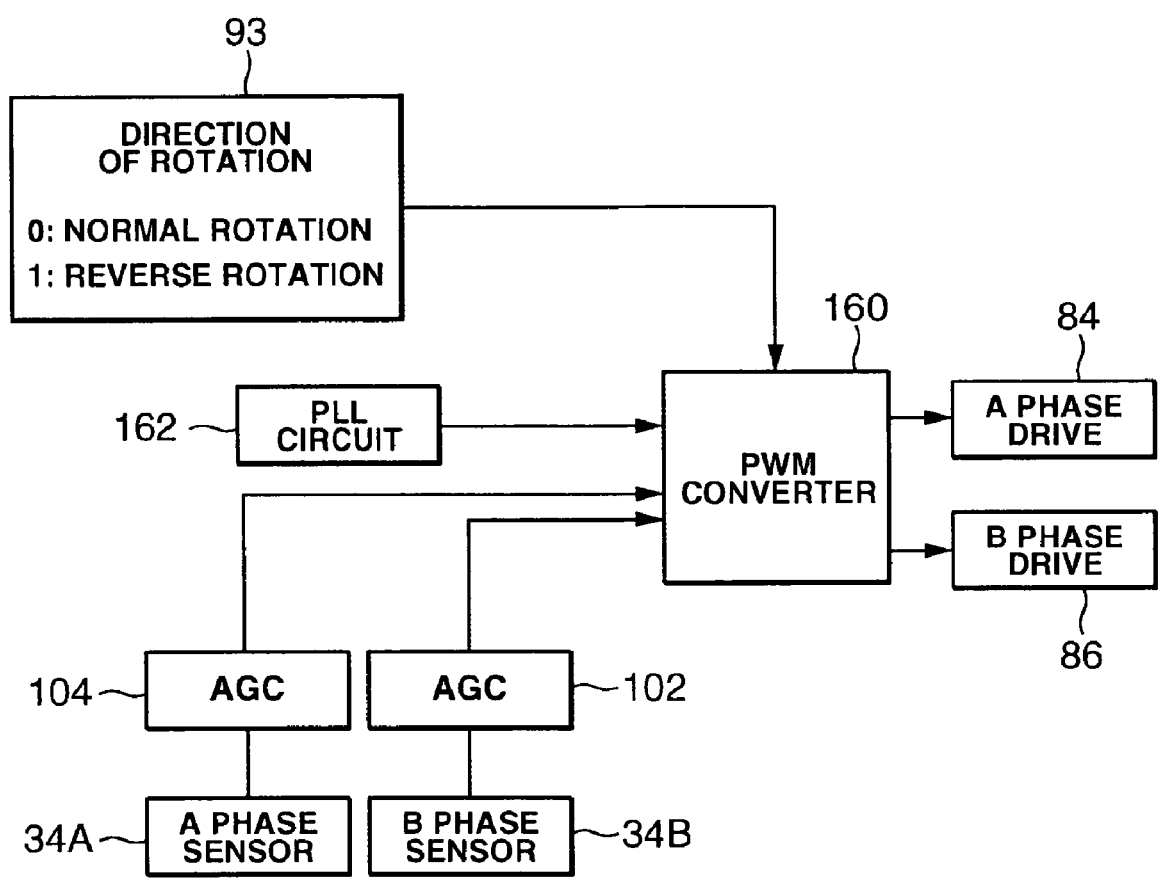
FIG. 14 is a block diagram of the PWM control circuit based on the analog output sensor.
Figure 15:
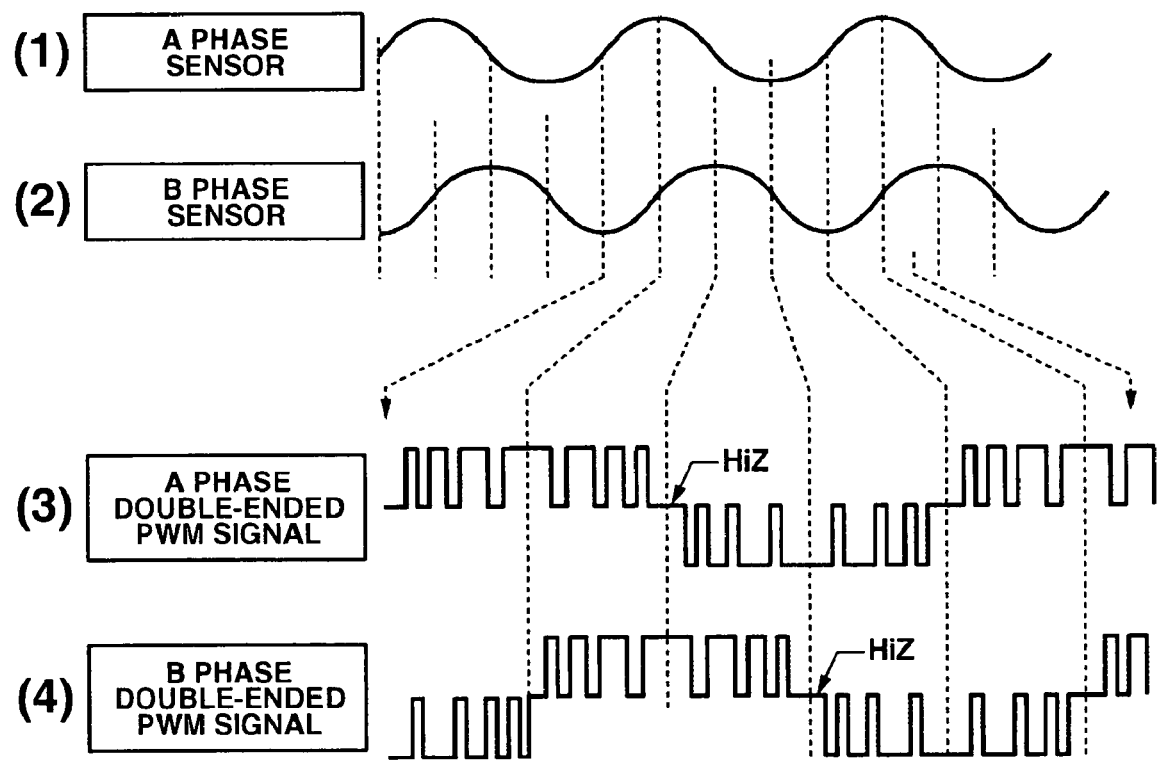
FIG. 15 is a waveform diagram showing the PWM control operation thereof.

FIG. 14 is a diagram showing the circuit constitution in a case of performing PWM control, without depending on the control of the hysteresis level, based on the analog sensor output. The PWM converter 160 is supplied with a comparative wave in which the reference frequency signal from the PLL circuit 162 was divided, and, as a result of this comparative wave and the analog detection value from the A phase sensor and B phase sensor being compared, a duty-adjusted signal wave is supplied to the respective phase coil arrays. When the peak of the analog output value is adjusted with the auto gain controls 102, 104, as a result of the frequency of the comparative signal of the PLL circuit 162 being controlled, and suitably setting these with the likes of a CPU according to the requested torque of the motor, as shown in FIG. 15, the PWM output can be obtained from the sensor output. Incidentally, in the foregoing embodiments, although the permanent magnet array was explained as a rotor, this may also be a linear motor that moves linearly.

Figure 16:
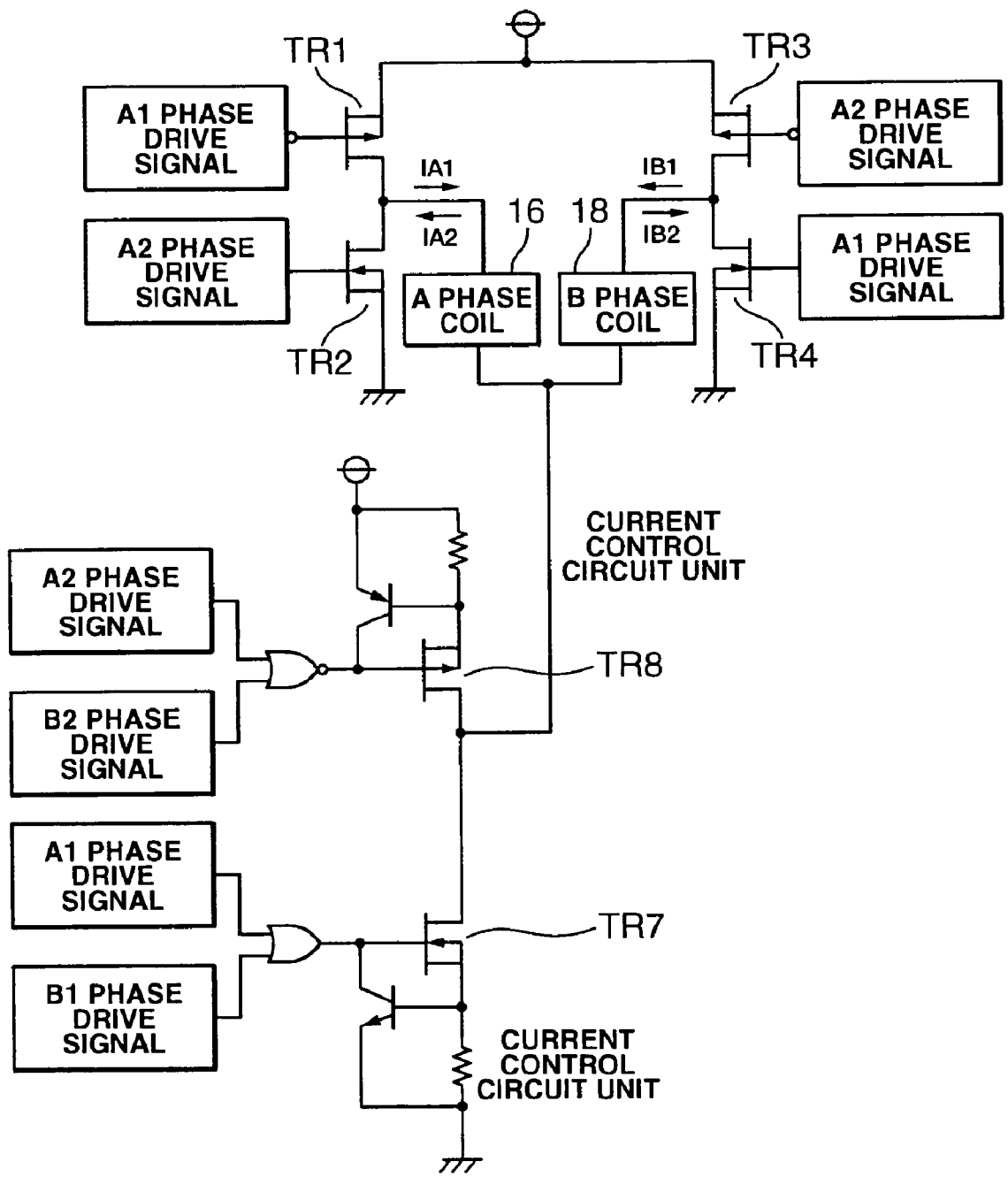
FIG. 16 is a block diagram showing another example of the coil drive circuit.
Figure 17:
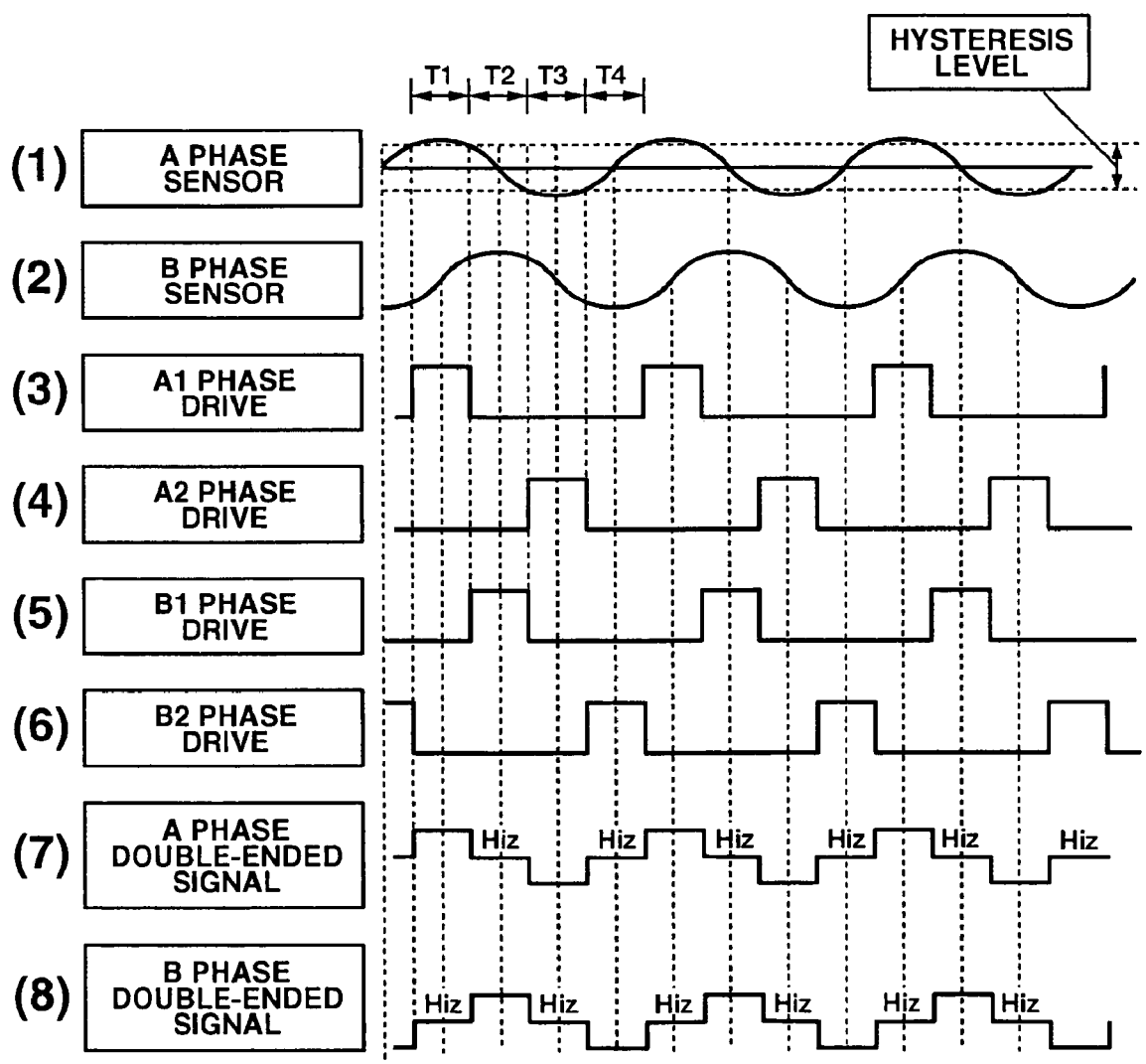
FIG. 17 is the drive waveform diagram thereof.

FIG. 16 is a diagram showing the second example of the drive circuit, and the drive circuits of the A phase coil and B phase coil formed separated in the circuit of FIG. 5 are formed as a single drive circuit. To explain with reference to FIG. 17, during the period of T1, TR1 and TR7 are turned on with the sensor output, and the excitation current in the direction of IA1 supplied from the power source flows from the transistor TR1 to the A phase coil 16, and to the earth via the transistor TR7. During the period of T2, TR3 and TR7 are turned on, and the excitation current from the power source passes through the B phase coil in the direction of IB1, passes through TR7 and arrives at the earth. During the period of T3, TR2 is turned on, TR8 is turned on, and the excitation current from the power source flows to the direction of the IA2 and arrives at the earth. During the period of T4, TR4 is turned on, TR8 is turned on, and the excitation current from the power source to the direction of the IB2 and arrives at the earth.

Figure 18:
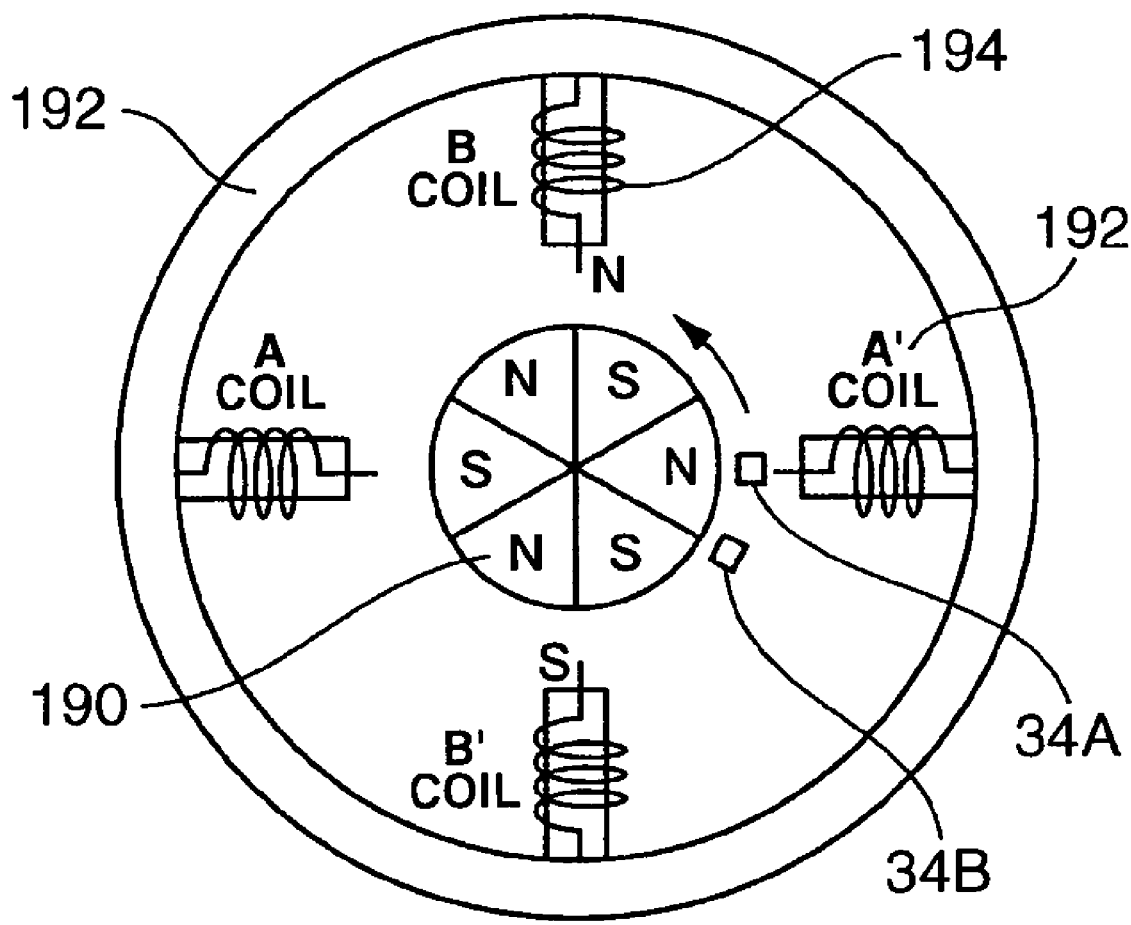
FIG. 18 is a block diagram in the case of employing the present invention in a stepping motor.
Figure 19:
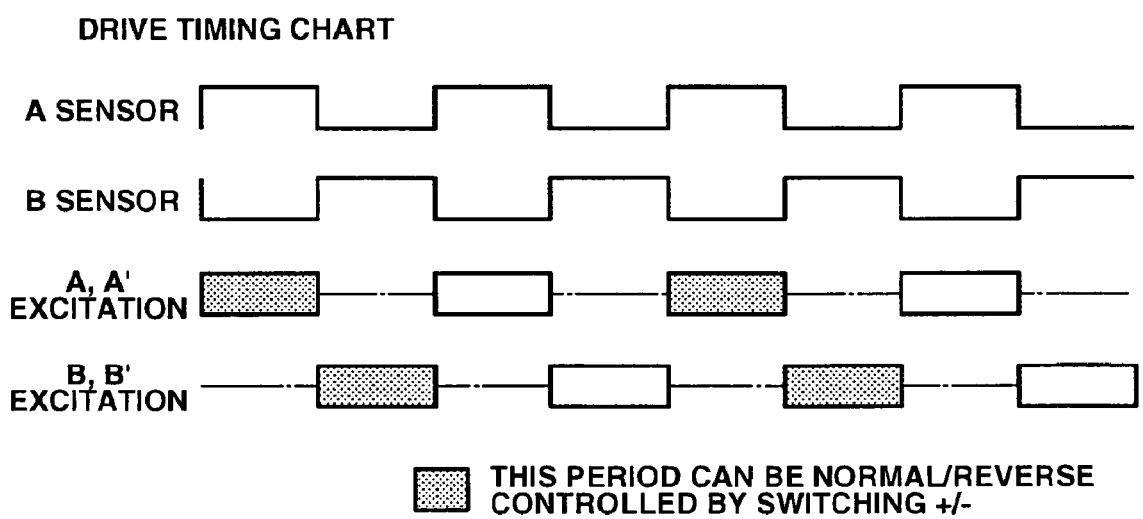
FIG. 19 is a waveform diagram of sensor direct drive system in a stepping motor.

FIG. 18 is shows the sensor direct drive system according to the present invention; in other words, it is a circuit diagram in a case of adopting the drive system of directly inputting the detection signal from the sensor to the drive circuit for driving the coil in a stepping motor. Reference numeral 190 is a rotor comprising a plurality of permanent magnets, wherein reference numeral 192 is an A–A' phase coil, reference numeral 194 is a B–B' phase coil, reference numeral 34A is an A phase sensor, and reference numeral 34B is a B phase sensor. FIG. 19 is a coil drive timing chart, and the A phase sensor output is supplied as the coil excitation current to the A–A' phase coil drive circuit, and the B phase sensor output is supplied to the B–B' phase coil drive circuit. The shaded portions in FIG. 19 allow the control of the normal rotation/reverse rotation of the rotor via switching the polarity. According to this embodiment, the drive yielding point caused by the load change of the stepping motor can be eliminated.

Figure 20:
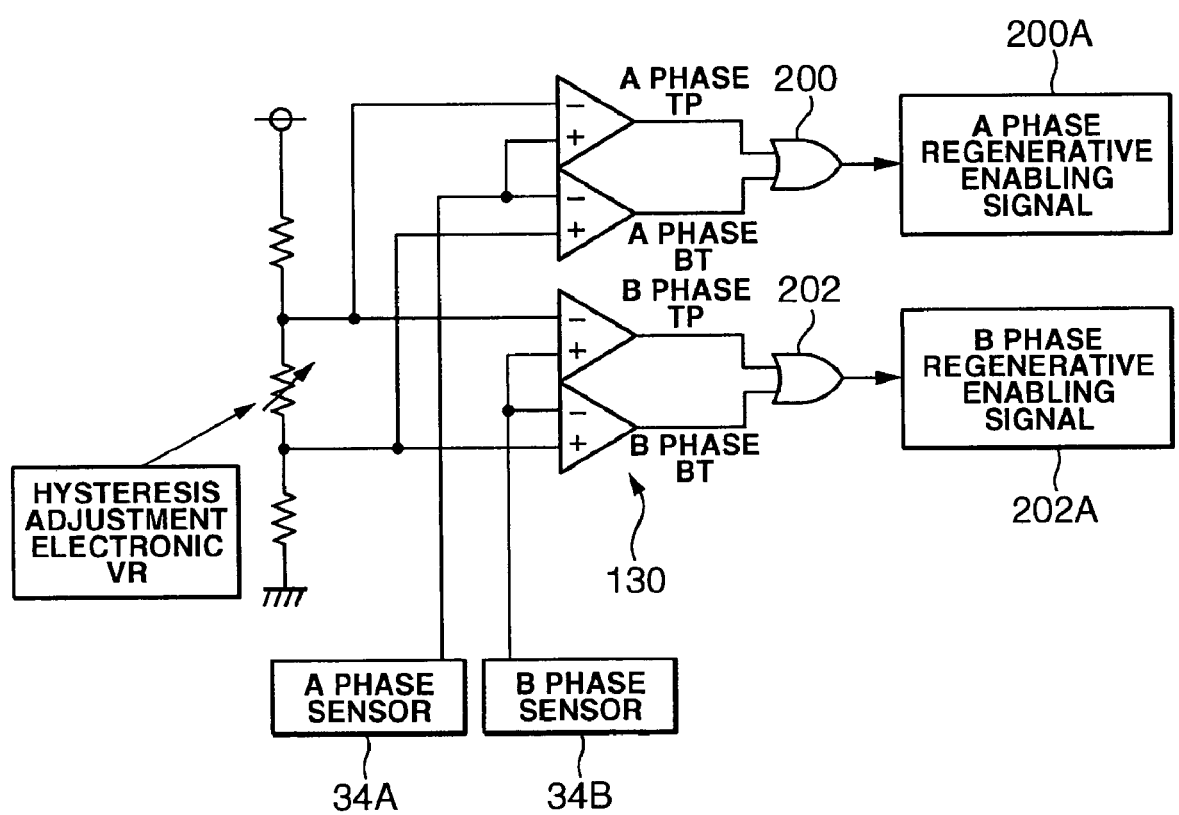
FIG. 20 is a block diagram of the digital regeneration/power generation control based on an analog sensor comprising a window comparator having a hysteresis adjustment electronic VR.

FIG. 20 is a block diagram of the digital regeneration/power generation control based on an analog sensor comprising the wind comparator with a hysteresis adjustment electronic VR. When the output of the A phase sensor 34A exceeds the fluctuation margin of the hysteresis level, "H" of the A phase TP or A phase BT is output to the OR circuit 200, and this is output as the A phase regenerative enabling signal to the incoming control circuit described later. The same applies to the output of the B phase sensor 34B. Reference numeral 202 is the OR circuit.

Figure 21:
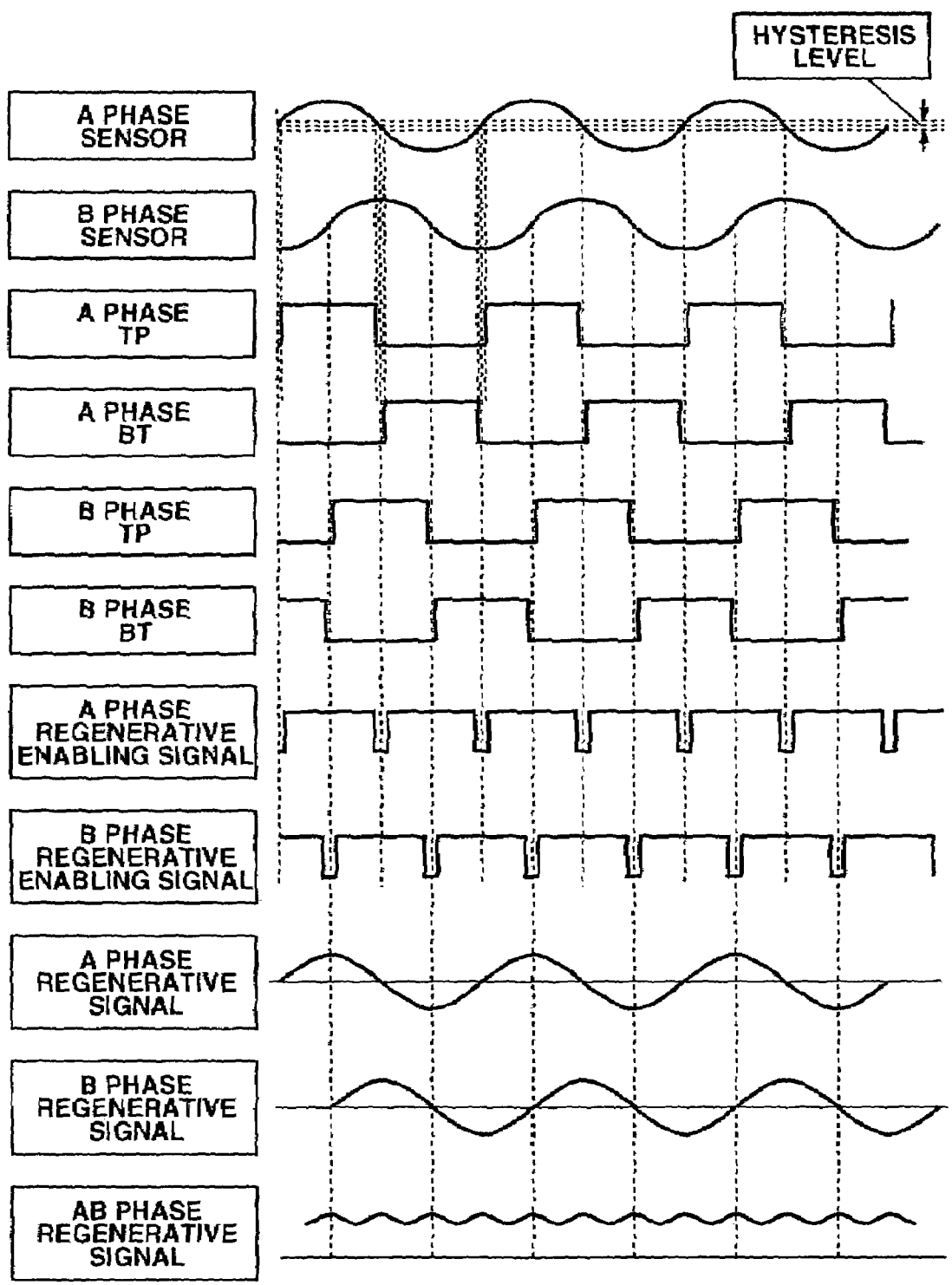
FIG. 21 is a waveform diagram showing a case where the hysteresis adjustment electronic VR is small and the regenerative energy is maximum.
Figure 22:
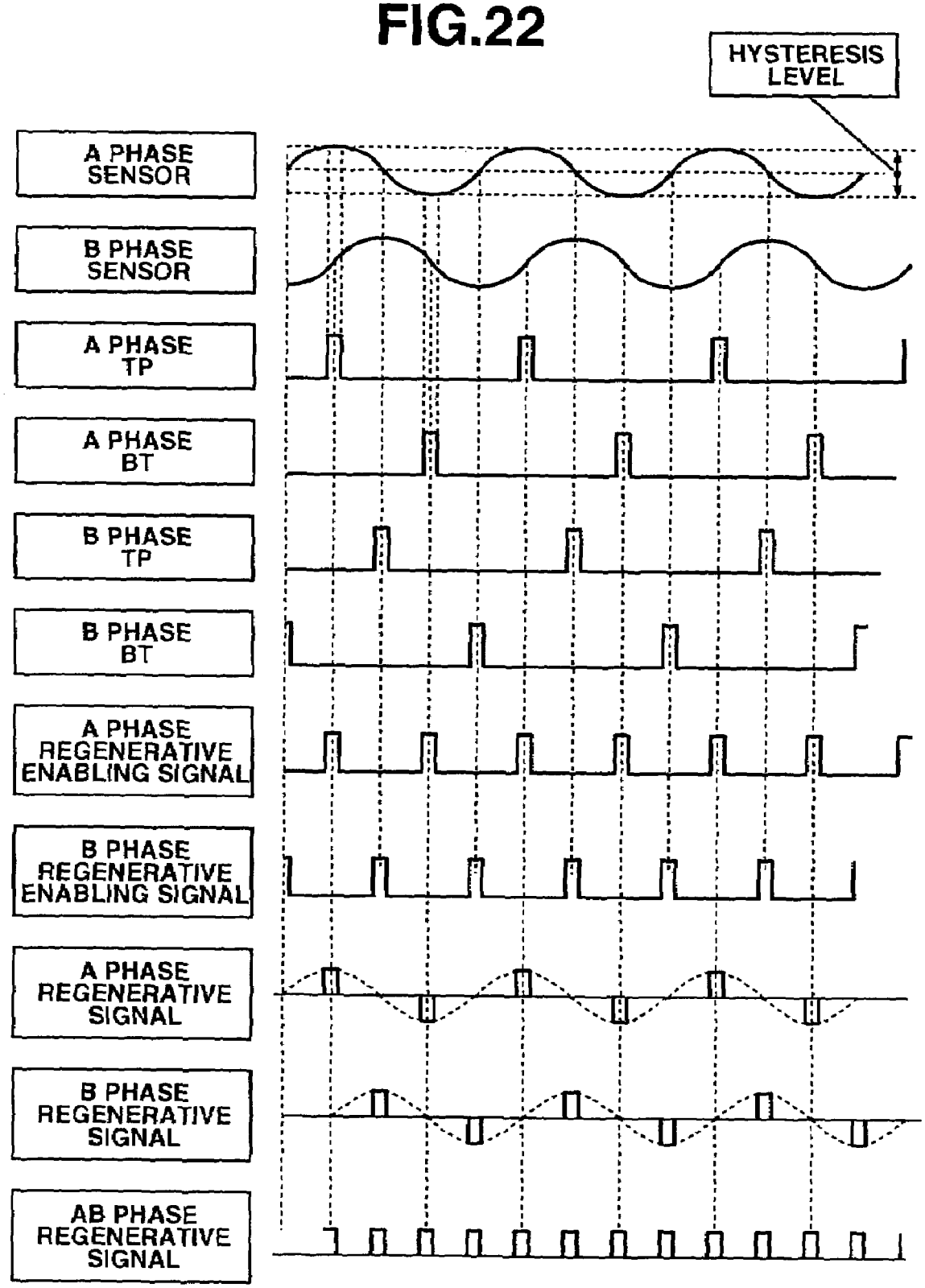
FIG. 22 is a waveform diagram showing a case where the hysteresis adjustment electronic VR is maximum and the regenerative energy is minimum.

FIG. 21 is a waveform diagram showing a case when the hysteresis adjustment electronic VR is small and the regenerative energy is maximum, and FIG. 22 is a waveform diagram showing a case when the hysteresis adjustment electronic VR is maximum and the regenerative energy is minimum. In the case of a high load (strong regenerative braking state), the duty ratio of the regenerative enabling signal of the respective phases will become high, and, when the regenerative enabling signal is in the period of "H", the regenerative current from the respective coils of the A phase and B phase is supplied to the load (battery). This is the state illustrated in FIG. 21. Meanwhile, in the case of a low load (weak regenerative braking state), as shown in FIG. 22, the duty ratio of the enabling signal of the respective phases will become small, and when the regenerative enabling signal is in the period of "H", the regenerative current from the respective phase coils is supplied to the load.

Figure 23:
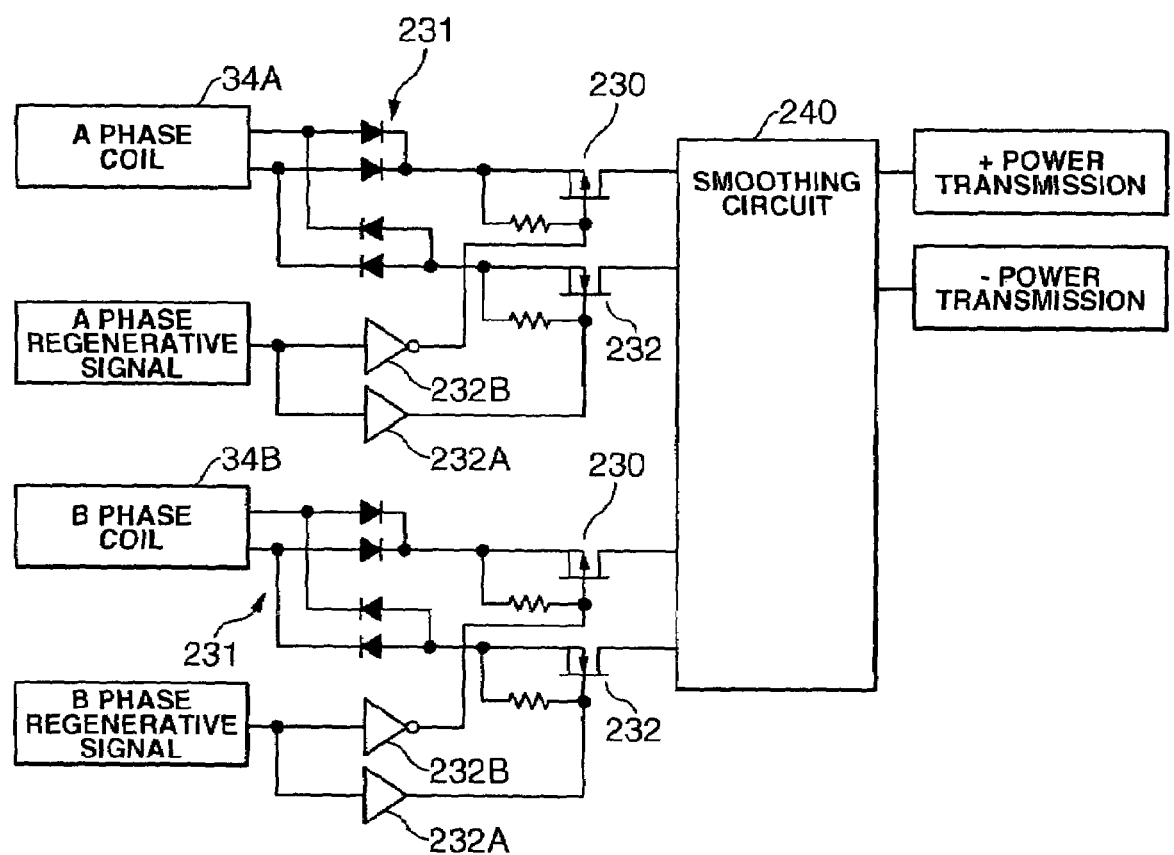
FIG. 23 is a functional block diagram of the incoming control from the respective phase coils.
Figure 24:
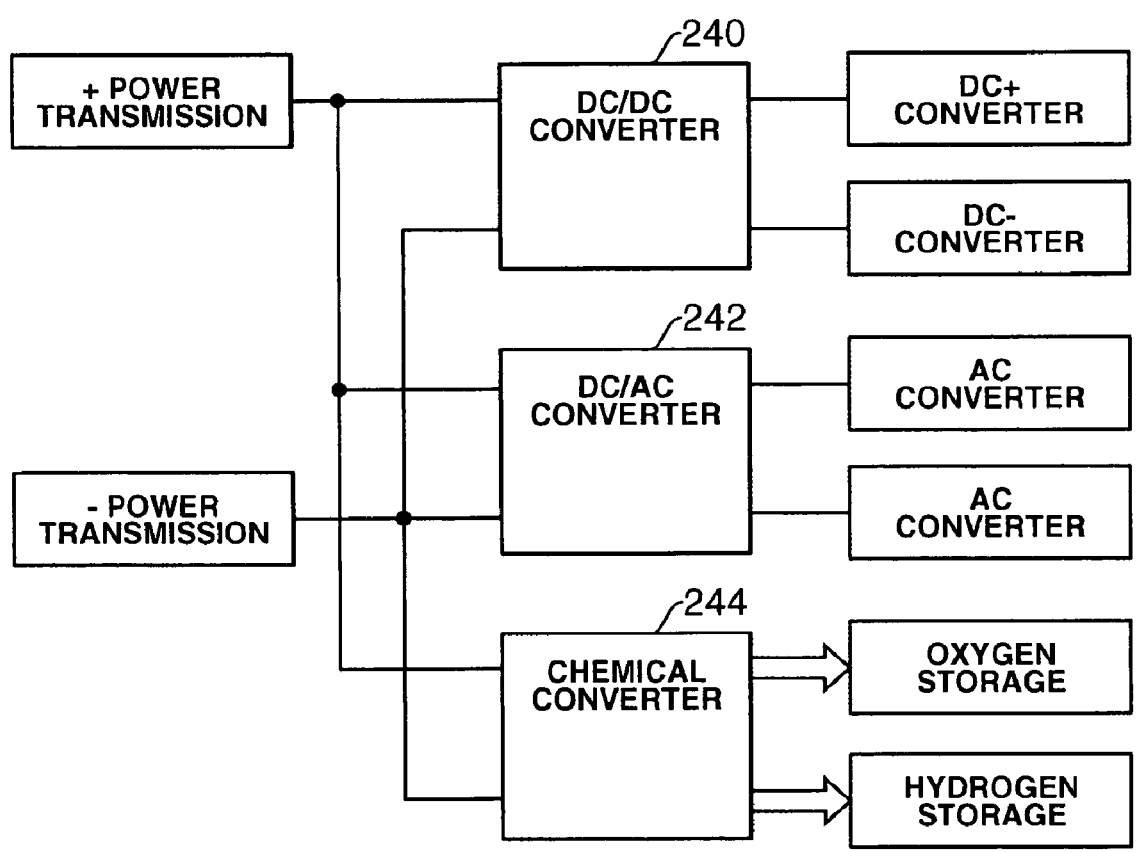
FIG. 24 is a block diagram showing the energy converter of the regenerative current.

FIG. 23 is a diagram showing the functional block diagram of the incoming control from the respective phase coils, and, in accordance with the switching of the H or L of the A phase regenerative enabling signal, the transistors 230 and 232 will be alternately turned on via the inverters 232A and 232B when the foregoing signal is supplied, and the regenerative current which has been rectified with the rectifying means 231 and smoothed with the smoothing circuit 240 will generate between the +power transmission terminal and –power transmission terminal. The same applies to the B phase coil side. FIG. 24 shows the energy converter of the regenerative current, wherein reference numeral 240 is the DC/DC converter, reference numeral 242 is the DC/AC converter, and reference numeral 244 is a chemical converter (battery).

Incidentally, the foregoing constitution, as shown in FIG. 25(1) and FIG. 25(2), may also be adopted in the structure where the A phase coil 16 and B phase coil 18, and the rotor 20 formed from a permanent magnet face each other in the radial direction. FIG. 25(1) is a plan view of the motor, and FIG. 25(2) is the A–A' cross section of FIG. 25(1). Although the stator was explained as the two phases of A phase and B phase, the rotation/torque will decrease, but an independent drive and regeneration based on a single phase is also possible. As a result of fluctuating the magnetic field intensity by making the distance between the rotor and the A phase and B phase of the stator variable, the rotation/torque characteristics can also be made variable. The rotation/torque characteristics can also be made variable by changing the establishment position angle of the A phase/B phase of the stator.

According to the embodiments described above, since the output of the sensor of the respective phases for detecting the magnetic field change accompanying the rotation of the rotor is directly supplied to the two-phase electromagnetic coils set upon shifting the angles, the rotor can be rotated with a weak current (micro order level) during the torque request operation upon starting the drive of the motor.

What is claimed is:

1. A motor drive system comprising:
   a movable body with a plurality of permanent magnets, alternately magnetized at opposite poles, continuously disposed thereon;
   a plurality of stators each consisting of an array of electromagnetic coils disposed so that they do not come into contact with said movable body, said electromagnetic coil arrays having a plurality of phases, there being phase difference between the electromagnetic coils of the respective phases; and a drive circuit that moves said movable body based on the attraction—repulsion between said movable body and electromagnetic coils generated by supplying an excitation current to each electromagnetic coil array to alternately magnetize the electromagnetic coils in each electromagnetic coil array at opposite poles, wherein said drive circuit includes:

sensors that each detect the periodic magnetic field change caused by the movement of said permanent magnets to output an analog value, said sensors having the same phase differences as the electromagnetic coils;

a gain controller that adjusts the peak value of the analog output value of each sensor and outputs the peak value;

a movement direction instruction unit for the motor;

a reversal circuit that reverses the movement direction of said movable body by reversing the polarity of output from each sensor based on the output from the movement direction instruction unit; and a PWM control unit that creates a pattern for exciting said electromagnetic coils by amplifying the output of said gain controller and then performing PWM control on the output of said gain controller, and that directly supplies said electromagnetic coils with that pattern as a waveform for driving said electromagnetic coils; and wherein said movable body is constructed to have a plurality of constitutions in which the same heteropolar arrangement of a plurality of different permanent magnets constitutes a pair, and, when the position between said heteropolar arrangement constituting a pair is $2\pi$, said each sensor is able to linearly detect an arbitrary position between said $2\pi$.

2. The system according to claim 1, wherein the analogue output is returned to said coils according to an arbitrary position signal level obtained from said sensors for the coils of said respective phases.

3. The system according to claim 1, wherein a plurality of patterns of excitation signals are supplied according to the analog output values of the sensors for the coils of the respective phases.

4. The motor drive system according to claim 1, wherein, regardless of at which position said movable body is stopped, at least one signal from among said plurality of patterns of excitation signals according to the analog output values of the sensors for the coils of the respective phases is set so that the coils of each phase enter an excitation state.

5. The motor drive system according to any one of claims 1 to 4, wherein said sensors are hall element sensors that each output an analog detection value.

6. The motor regenerative drive system using the system according to claim 1 also for regeneration, wherein provided is regeneration control means for controlling regeneration based on analog output signals from said sensors, and said control means has means for forming regenerative enabling signals from said analog output signals from said sensors, means for controlling the duty ratio of each regenerative enabling signal based on a load status, and means for arbitrarily controlling the regeneration of said motor based on the duty ratio.

7. The system according to claim 6, wherein means for forming said regenerative enabling signal is means for fluctuating the hysteresis level of the analog output signals from said sensors in accordance with an arbitrary load fluctuation.

8. The motor regenerative drive system according to claim 7, wherein PWM control is added based on said analog output signals from said sensors, and the regeneration obtained from said electromagnetic coils based on the control signal can be made arbitrarily variable.

9. The system according to claim 1 of controlling the analog output signals of said sensors according to the drive level of the requested motor, wherein, by changing the hysteresis level of the analog output signals from the sensors according to said drive level, the duty ratio is changed.

* * * * *